US010380623B2

(12) United States Patent
Raichelgauz et al.

(10) Patent No.: US 10,380,623 B2
(45) Date of Patent: Aug. 13, 2019

(54) SYSTEM AND METHOD FOR GENERATING AN ADVERTISEMENT EFFECTIVENESS PERFORMANCE SCORE

(71) Applicant: Cortica, Ltd., Ramat Gan (IL)

(72) Inventors: Igal Raichelgauz, New York, NY (US); Karina Odinaev, New York, NY (US); Yehoshua Y. Zeevi, Haifa (IL)

(*) Notice: Subject to any disclaimer, the term of this patent is extended or adjusted under 35 U.S.C. 154(b) by 364 days.

(21) Appl. No.: 14/621,661

(22) Filed: Feb. 13, 2015

(65) Prior Publication Data

US 2015/0161653 A1 Jun. 11, 2015

Related U.S. Application Data

(63) Continuation-in-part of application No. 13/770,603, filed on Feb. 19, 2013, which is a continuation-in-part
(Continued)

(30) Foreign Application Priority Data

| Oct. 26, 2005 | (IL) | 171577 |
| Jan. 29, 2006 | (IL) | 173409 |
| Aug. 21, 2007 | (IL) | 185414 |

(51) Int. Cl.
*G06Q 30/02* (2012.01)
*G06F 17/30* (2006.01)
(Continued)

(52) U.S. Cl.
CPC ... *G06Q 30/0242* (2013.01); *G06F 17/30899* (2013.01); *G06Q 30/0251* (2013.01);
(Continued)

(58) Field of Classification Search
CPC ............ G06Q 30/0242; G06Q 30/0251; G06F 17/30899; H04N 7/17318;
(Continued)

(56) References Cited

U.S. PATENT DOCUMENTS

| 4,733,353 A | 3/1988 | Jaswa |
| 4,932,645 A | 6/1990 | Schorey et al. |

(Continued)

FOREIGN PATENT DOCUMENTS

| WO | 0231764 | 4/2002 |
| WO | 2003005242 A1 | 1/2003 |

(Continued)

OTHER PUBLICATIONS

Liu, et al., "Instant Mobile Video Search With Layered Audio-Video Indexing and Progressive Transmission", Multimedia, IEEE Transactions on Year: 2014, vol. 16, Issue: 8, pp. 2242-2255, DOI: 10.1109/TMM.2014.2359332 IEEE Journals & Magazines.
(Continued)

*Primary Examiner* — Dave Misir

(57) ABSTRACT

A system and method for generating an advertisement effectiveness performance score of a multimedia content element displayed in a webpage are provided. The method includes determining an advertisement context of an advertisement; analyzing metadata associated with at least one prior advertisement to determine a prior advertisement success score; determining a multimedia context of the multimedia content element displayed in the webpage; matching the advertisement context to the multimedia context to determine a context matching score; and generating an advertisement effectiveness score at least based on the prior advertisement success score and the context matching score.

13 Claims, 7 Drawing Sheets

Related U.S. Application Data of application No. 13/624,397, filed on Sep. 21, 2012, now Pat. No. 9,191,626, which is a continuation-in-part of application No. 13/344,400, filed on Jan. 5, 2012, now Pat. No. 8,959,037, which is a continuation of application No. 12/434,221, filed on May 1, 2009, now Pat. No. 8,112,376, said application No. 13/624,397 is a continuation-in-part of application No. 12/195,863, filed on Aug. 21, 2008, now Pat. No. 8,326,775, which is a continuation-in-part of application No. 12/084,150, filed on Apr. 7, 2009, now Pat. No. 8,655,801, said application No. 13/624,397 is a continuation-in-part of application No. 12/084,150, filed as application No. PCT/IL2006/001235 on Oct. 26, 2006, now Pat. No. 8,655,801.

(60) Provisional application No. 61/939,290, filed on Feb. 13, 2014.

(51) Int. Cl.
*H04N 7/173* (2011.01)
*H04N 21/258* (2011.01)
*H04N 21/2668* (2011.01)
*H04N 21/466* (2011.01)
*H04N 21/81* (2011.01)

(52) U.S. Cl.
CPC ... *H04N 7/17318* (2013.01); *H04N 21/25891* (2013.01); *H04N 21/2668* (2013.01); *H04N 21/466* (2013.01); *H04N 21/8106* (2013.01)

(58) Field of Classification Search
CPC ......... H04N 21/25891; H04N 21/2668; H04N 21/466; H04N 21/8106; G06N 5/02; G06N 5/04
USPC .......................................................... 706/46
See application file for complete search history.

(56) References Cited

U.S. PATENT DOCUMENTS

| | | |
|---|---|---|
| 4,972,363 A | 11/1990 | Nguyen et al. |
| 5,214,746 A | 5/1993 | Fogel et al. |
| 5,307,451 A | 4/1994 | Clark |
| 5,568,181 A | 10/1996 | Greenwood et al. |
| 5,638,425 A | 6/1997 | Meador et al. |
| 5,745,678 A | 4/1998 | Herzberg et al. |
| 5,806,061 A | 9/1998 | Chaudhuri et al. |
| 5,852,435 A | 12/1998 | Vigneaux et al. |
| 5,870,754 A | 2/1999 | Dimitrova et al. |
| 5,873,080 A | 2/1999 | Coden et al. |
| 5,887,193 A | 3/1999 | Takahashi et al. |
| 5,940,821 A | 8/1999 | Wical |
| 5,978,754 A | 11/1999 | Kumano |
| 5,987,454 A | 11/1999 | Hobbs |
| 5,991,306 A | 11/1999 | Burns et al. |
| 6,038,560 A | 3/2000 | Wical |
| 6,052,481 A | 4/2000 | Grajski et al. |
| 6,070,167 A | 5/2000 | Qian et al. |
| 6,076,088 A | 6/2000 | Paik et al. |
| 6,122,628 A | 9/2000 | Castelli et al. |
| 6,128,651 A | 10/2000 | Cezar |
| 6,137,911 A | 10/2000 | Zhilyaev |
| 6,144,767 A | 11/2000 | Bottou et al. |
| 6,147,636 A | 11/2000 | Gershenson |
| 6,240,423 B1 | 5/2001 | Hirata |
| 6,243,375 B1 | 6/2001 | Speicher |
| 6,243,713 B1 | 6/2001 | Nelson et al. |
| 6,275,599 B1 | 8/2001 | Adler et al. |
| 6,329,986 B1 | 12/2001 | Cheng |
| 6,363,373 B1 | 3/2002 | Steinkraus |
| 6,381,656 B1 | 4/2002 | Shankman |
| 6,411,229 B2 | 6/2002 | Kobayashi |
| 6,422,617 B1 | 7/2002 | Fukumoto et al. |
| 6,493,692 B1 | 12/2002 | Kobayashi et al. |
| 6,493,705 B1 | 12/2002 | Kobayashi et al. |
| 6,507,672 B1 | 1/2003 | Watkins et al. |
| 6,523,022 B1 | 2/2003 | Hobbs |
| 6,523,046 B2 | 2/2003 | Liu et al. |
| 6,524,861 B1 | 2/2003 | Anderson |
| 6,526,400 B1 | 2/2003 | Takata et al. |
| 6,550,018 B1 | 4/2003 | Abonamah et al. |
| 6,557,042 B1 | 4/2003 | He et al. |
| 6,560,597 B1 | 5/2003 | Dhillon et al. |
| 6,594,699 B1 | 7/2003 | Sahai et al. |
| 6,601,026 B2 | 7/2003 | Appelt et al. |
| 6,601,060 B1 | 7/2003 | Tomaru |
| 6,611,628 B1 | 8/2003 | Sekiguchi et al. |
| 6,611,837 B2 | 8/2003 | Schreiber |
| 6,618,711 B1 | 9/2003 | Ananth |
| 6,643,620 B1 | 11/2003 | Contolini et al. |
| 6,643,643 B1 | 11/2003 | Lee et al. |
| 6,665,657 B1 | 12/2003 | Dibachi |
| 6,675,159 B1 | 1/2004 | Lin et al. |
| 6,704,725 B1 | 3/2004 | Lee |
| 6,728,706 B2 | 4/2004 | Aggarwal et al. |
| 6,732,149 B1 | 5/2004 | Kephart |
| 6,751,363 B1 | 6/2004 | Natsev et al. |
| 6,751,613 B1 | 6/2004 | Lee et al. |
| 6,754,435 B2 | 6/2004 | Kim |
| 6,763,069 B1 | 7/2004 | Divakaran et al. |
| 6,763,519 B1 | 7/2004 | McColl et al. |
| 6,774,917 B1 | 8/2004 | Foote et al. |
| 6,795,818 B1 | 9/2004 | Lee |
| 6,804,356 B1 | 10/2004 | Krishnamachari |
| 6,813,395 B1 | 11/2004 | Kinjo |
| 6,819,797 B1 | 11/2004 | Smith et al. |
| 6,836,776 B2 | 12/2004 | Schreiber |
| 6,845,374 B1 | 1/2005 | Oliver et al. |
| 6,901,207 B1 | 5/2005 | Watkins |
| 6,938,025 B1 | 8/2005 | Lulich et al. |
| 6,970,881 B1 | 11/2005 | Mohan et al. |
| 6,978,264 B2 | 12/2005 | Chandrasekar et al. |
| 7,006,689 B2 | 2/2006 | Kasutani |
| 7,013,051 B2 | 3/2006 | Sekiguchi et al. |
| 7,020,654 B1 | 3/2006 | Najmi |
| 7,043,473 B1 | 5/2006 | Rassool et al. |
| 7,047,033 B2 | 5/2006 | Wyler |
| 7,124,149 B2 | 10/2006 | Smith et al. |
| 7,158,681 B2 | 1/2007 | Persiantsev |
| 7,199,798 B1 | 4/2007 | Echigo et al. |
| 7,215,828 B2 | 5/2007 | Luo |
| 7,260,564 B1 | 8/2007 | Lynn et al. |
| 7,277,928 B2 | 10/2007 | Lennon |
| 7,296,012 B2 | 11/2007 | Ohashi |
| 7,299,261 B1 | 11/2007 | Oliver et al. |
| 7,302,117 B2 | 11/2007 | Sekiguchi et al. |
| 7,313,805 B1 | 12/2007 | Rosin et al. |
| 7,340,458 B2 | 3/2008 | Vaithilingam et al. |
| 7,346,629 B2 | 3/2008 | Kapur et al. |
| 7,353,224 B2 | 4/2008 | Chen et al. |
| 7,376,672 B2 | 5/2008 | Weare |
| 7,376,722 B1 | 5/2008 | Sim et al. |
| 7,392,238 B1 | 6/2008 | Zhou et al. |
| 7,406,459 B2 | 7/2008 | Chen et al. |
| 7,433,895 B2 | 10/2008 | Li et al. |
| 7,450,740 B2 | 11/2008 | Shah et al. |
| 7,464,086 B2 | 12/2008 | Black et al. |
| 7,519,238 B2 | 4/2009 | Robertson et al. |
| 7,523,102 B2 | 4/2009 | Bjarnestam et al. |
| 7,526,607 B1 | 4/2009 | Singh et al. |
| 7,529,659 B2 | 5/2009 | Wold |
| 7,536,384 B2 | 5/2009 | Venkataraman et al. |
| 7,536,417 B2 | 5/2009 | Walsh et al. |
| 7,542,969 B1 | 6/2009 | Rappaport et al. |
| 7,548,910 B1 | 6/2009 | Chu et al. |
| 7,555,477 B2 | 6/2009 | Bayley et al. |
| 7,555,478 B2 | 6/2009 | Bayley et al. |
| 7,562,076 B2 | 7/2009 | Kapur |
| 7,574,436 B2 | 8/2009 | Kapur et al. |
| 7,574,668 B2 | 8/2009 | Nunez et al. |

(56) References Cited

U.S. PATENT DOCUMENTS

| | | |
|---|---|---|
| 7,577,656 B2 | 8/2009 | Kawai et al. |
| 7,657,100 B2 | 2/2010 | Gokturk et al. |
| 7,660,468 B2 | 2/2010 | Gokturk et al. |
| 7,660,737 B1 | 2/2010 | Lim et al. |
| 7,689,544 B2 | 3/2010 | Koenig |
| 7,694,318 B2 | 4/2010 | Eldering et al. |
| 7,697,791 B1 | 4/2010 | Chan et al. |
| 7,769,221 B1 | 8/2010 | Shakes et al. |
| 7,788,132 B2 | 8/2010 | Desikan et al. |
| 7,788,247 B2 | 8/2010 | Wang et al. |
| 7,836,054 B2 | 11/2010 | Kawai et al. |
| 7,860,895 B1 | 12/2010 | Scofield et al. |
| 7,904,503 B2 | 3/2011 | De |
| 7,920,894 B2 | 4/2011 | Wyler |
| 7,921,107 B2 | 4/2011 | Chang et al. |
| 7,933,407 B2 | 4/2011 | Keidar et al. |
| 7,974,994 B2 | 7/2011 | Li et al. |
| 7,987,194 B1 | 7/2011 | Walker et al. |
| 7,987,217 B2 | 7/2011 | Long et al. |
| 7,991,715 B2 | 8/2011 | Schiff et al. |
| 8,000,655 B2 | 8/2011 | Wang et al. |
| 8,023,739 B2 | 9/2011 | Hohimer et al. |
| 8,036,893 B2 | 10/2011 | Reich |
| 8,098,934 B2 | 1/2012 | Vincent et al. |
| 8,112,376 B2 | 2/2012 | Raichelgauz et al. |
| 8,266,185 B2 | 9/2012 | Raichelgauz et al. |
| 8,312,031 B2 | 11/2012 | Raichelgauz et al. |
| 8,315,442 B2 | 11/2012 | Gokturk et al. |
| 8,316,005 B2 | 11/2012 | Moore |
| 8,326,775 B2 | 12/2012 | Raichelgauz et al. |
| 8,332,478 B2 | 12/2012 | Levy et al. |
| 8,345,982 B2 | 1/2013 | Gokturk et al. |
| 8,495,489 B1 | 7/2013 | Everingham |
| 8,548,828 B1 | 10/2013 | Longmire |
| 8,655,801 B2 | 2/2014 | Raichelgauz et al. |
| 8,677,377 B2 | 3/2014 | Cheyer et al. |
| 8,682,667 B2 | 3/2014 | Haughay |
| 8,688,446 B2 | 4/2014 | Yanagihara |
| 8,706,503 B2 | 4/2014 | Cheyer et al. |
| 8,775,442 B2 | 7/2014 | Moore et al. |
| 8,799,195 B2 | 8/2014 | Raichelgauz et al. |
| 8,799,196 B2 | 8/2014 | Raichelquaz et al. |
| 8,818,916 B2 | 8/2014 | Raichelgauz et al. |
| 8,868,619 B2 | 10/2014 | Raichelgauz et al. |
| 8,868,861 B2 | 10/2014 | Shimizu et al. |
| 8,880,539 B2 | 11/2014 | Raichelgauz et al. |
| 8,880,566 B2 | 11/2014 | Raichelgauz et al. |
| 8,886,648 B1 | 11/2014 | Procopio et al. |
| 8,898,568 B2 | 11/2014 | Bull et al. |
| 8,922,414 B2 | 12/2014 | Raichelgauz et al. |
| 8,959,037 B2 | 2/2015 | Raichelgauz et al. |
| 8,990,125 B2 | 3/2015 | Raichelgauz et al. |
| 9,009,086 B2 | 4/2015 | Raichelgauz et al. |
| 9,031,999 B2 | 5/2015 | Raichelgauz et al. |
| 9,087,049 B2 | 7/2015 | Raichelgauz et al. |
| 9,104,747 B2 | 8/2015 | Raichelgauz et al. |
| 9,165,406 B1 | 10/2015 | Gray et al. |
| 9,191,626 B2 | 11/2015 | Raichelgauz et al. |
| 9,197,244 B2 | 11/2015 | Raichelgauz et al. |
| 9,218,606 B2 | 12/2015 | Raichelgauz et al. |
| 9,235,557 B2 | 1/2016 | Raichelgauz et al. |
| 9,256,668 B2 | 2/2016 | Raichelgauz et al. |
| 9,323,754 B2 | 4/2016 | Ramanathan et al. |
| 9,330,189 B2 | 5/2016 | Raichelgauz et al. |
| 9,384,196 B2 | 7/2016 | Raichelgauz et al. |
| 9,438,270 B2 | 9/2016 | Raichelgauz et al. |
| 9,606,992 B2 | 3/2017 | Geisner et al. |
| 2001/0019633 A1 | 9/2001 | Tenze et al. |
| 2001/0038876 A1 | 11/2001 | Anderson |
| 2001/0056427 A1 | 12/2001 | Yoon et al. |
| 2002/0010682 A1 | 1/2002 | Johnson |
| 2002/0010715 A1 | 1/2002 | Chinn et al. |
| 2002/0019881 A1 | 2/2002 | Bokhari et al. |
| 2002/0032677 A1 | 3/2002 | Morgenthaler et al. |
| 2002/0038299 A1 | 3/2002 | Zernik et al. |
| 2002/0059580 A1 | 5/2002 | Kalker et al. |
| 2002/0072935 A1 | 6/2002 | Rowse et al. |
| 2002/0087530 A1 | 7/2002 | Smith et al. |
| 2002/0099870 A1 | 7/2002 | Miller et al. |
| 2002/0107827 A1 | 8/2002 | Benitez-Jimenez et al. |
| 2002/0123928 A1 | 9/2002 | Eldering et al. |
| 2002/0126872 A1 | 9/2002 | Brunk et al. |
| 2002/0129140 A1 | 9/2002 | Peled et al. |
| 2002/0129296 A1 | 9/2002 | Kwiat et al. |
| 2002/0143976 A1 | 10/2002 | Barker et al. |
| 2002/0147637 A1* | 10/2002 | Kraft .................... G06Q 30/02 705/14.42 |
| 2002/0152267 A1 | 10/2002 | Lennon |
| 2002/0157116 A1 | 10/2002 | Jasinschi |
| 2002/0159640 A1 | 10/2002 | Vaithilingam et al. |
| 2002/0161739 A1 | 10/2002 | Oh |
| 2002/0163532 A1 | 11/2002 | Thomas et al. |
| 2002/0174095 A1 | 11/2002 | Lulich et al. |
| 2002/0178410 A1 | 11/2002 | Haitsma et al. |
| 2003/0028660 A1 | 2/2003 | Igawa et al. |
| 2003/0041047 A1 | 2/2003 | Chang et al. |
| 2003/0050815 A1 | 3/2003 | Seigel et al. |
| 2003/0078766 A1 | 4/2003 | Appelt et al. |
| 2003/0086627 A1 | 5/2003 | Berriss et al. |
| 2003/0089216 A1 | 5/2003 | Birmingham et al. |
| 2003/0105739 A1 | 6/2003 | Essafi et al. |
| 2003/0126147 A1 | 7/2003 | Essafi et al. |
| 2003/0182567 A1 | 9/2003 | Barton et al. |
| 2003/0191764 A1 | 10/2003 | Richards |
| 2003/0200217 A1 | 10/2003 | Ackerman |
| 2003/0217335 A1 | 11/2003 | Chung et al. |
| 2003/0229531 A1* | 12/2003 | Heckerman ........... G06Q 30/02 705/14.41 |
| 2004/0003394 A1 | 1/2004 | Ramaswamy |
| 2004/0025180 A1 | 2/2004 | Begeja et al. |
| 2004/0068510 A1 | 4/2004 | Hayes et al. |
| 2004/0107181 A1 | 6/2004 | Rodden |
| 2004/0111465 A1 | 6/2004 | Chuang et al. |
| 2004/0117367 A1 | 6/2004 | Smith et al. |
| 2004/0117638 A1 | 6/2004 | Monroe |
| 2004/0128142 A1 | 7/2004 | Whitham |
| 2004/0128511 A1 | 7/2004 | Sun et al. |
| 2004/0133927 A1 | 7/2004 | Sternberg et al. |
| 2004/0153426 A1 | 8/2004 | Nugent |
| 2004/0215663 A1 | 10/2004 | Liu et al. |
| 2004/0249779 A1 | 12/2004 | Nauck et al. |
| 2004/0260688 A1 | 12/2004 | Gross |
| 2004/0267774 A1 | 12/2004 | Lin et al. |
| 2005/0021394 A1 | 1/2005 | Miedema et al. |
| 2005/0114198 A1* | 5/2005 | Koningstein .......... G06Q 30/02 705/14.42 |
| 2005/0131884 A1 | 6/2005 | Gross et al. |
| 2005/0144455 A1 | 6/2005 | Haitsma |
| 2005/0172130 A1 | 8/2005 | Roberts |
| 2005/0177372 A1 | 8/2005 | Wang et al. |
| 2005/0238198 A1 | 10/2005 | Brown et al. |
| 2005/0238238 A1 | 10/2005 | Xu et al. |
| 2005/0245241 A1 | 11/2005 | Durand et al. |
| 2005/0249398 A1 | 11/2005 | Khamene et al. |
| 2005/0256820 A1 | 11/2005 | Dugan et al. |
| 2005/0262428 A1* | 11/2005 | Little ................ G06F 17/30893 715/201 |
| 2005/0281439 A1 | 12/2005 | Lange |
| 2005/0289163 A1 | 12/2005 | Gordon et al. |
| 2005/0289590 A1 | 12/2005 | Cheok et al. |
| 2006/0004745 A1 | 1/2006 | Kuhn et al. |
| 2006/0013451 A1 | 1/2006 | Haitsma |
| 2006/0020860 A1 | 1/2006 | Tardif et al. |
| 2006/0020958 A1 | 1/2006 | Allamanche et al. |
| 2006/0026203 A1 | 2/2006 | Tan et al. |
| 2006/0031216 A1 | 2/2006 | Semple et al. |
| 2006/0041596 A1 | 2/2006 | Stirbu et al. |
| 2006/0048191 A1 | 3/2006 | Xiong |
| 2006/0064037 A1 | 3/2006 | Shalon et al. |
| 2006/0112035 A1 | 5/2006 | Cecchi et al. |
| 2006/0129822 A1 | 6/2006 | Snijder et al. |
| 2006/0143674 A1 | 6/2006 | Jones et al. |
| 2006/0153296 A1 | 7/2006 | Deng |
| 2006/0159442 A1 | 7/2006 | Kim et al. |

(56) References Cited

U.S. PATENT DOCUMENTS

| | | |
|---|---|---|
| 2006/0173688 A1 | 8/2006 | Whitham |
| 2006/0184638 A1 | 8/2006 | Chua et al. |
| 2006/0204035 A1 | 9/2006 | Guo et al. |
| 2006/0217818 A1 | 9/2006 | Fujiwara |
| 2006/0217828 A1 | 9/2006 | Hicken |
| 2006/0224529 A1 | 10/2006 | Kermani |
| 2006/0236343 A1 | 10/2006 | Chang |
| 2006/0242139 A1 | 10/2006 | Butterfield et al. |
| 2006/0242554 A1 | 10/2006 | Gerace et al. |
| 2006/0247983 A1 | 11/2006 | Dalli |
| 2006/0248558 A1 | 11/2006 | Barton et al. |
| 2006/0253423 A1 | 11/2006 | McLane et al. |
| 2006/0288002 A1 | 12/2006 | Epstein et al. |
| 2007/0009159 A1 | 1/2007 | Fan |
| 2007/0011151 A1 | 1/2007 | Hagar et al. |
| 2007/0019864 A1 | 1/2007 | Koyama et al. |
| 2007/0022374 A1 | 1/2007 | Huang et al. |
| 2007/0033163 A1 | 2/2007 | Epstein et al. |
| 2007/0038608 A1 | 2/2007 | Chen |
| 2007/0038614 A1* | 2/2007 | Guha ............... G06Q 30/02 |
| 2007/0042757 A1 | 2/2007 | Jung et al. |
| 2007/0061302 A1 | 3/2007 | Ramer et al. |
| 2007/0067304 A1 | 3/2007 | Ives |
| 2007/0067682 A1 | 3/2007 | Fang |
| 2007/0071330 A1 | 3/2007 | Oostveen et al. |
| 2007/0074147 A1 | 3/2007 | Wold |
| 2007/0083611 A1* | 4/2007 | Farago ............... G06Q 30/02 709/217 |
| 2007/0091106 A1 | 4/2007 | Moroney |
| 2007/0130112 A1 | 6/2007 | Lin |
| 2007/0130159 A1 | 6/2007 | Gulli et al. |
| 2007/0156720 A1 | 7/2007 | Maren |
| 2007/0168413 A1 | 7/2007 | Barletta et al. |
| 2007/0174320 A1 | 7/2007 | Chou |
| 2007/0195987 A1 | 8/2007 | Rhoads |
| 2007/0220573 A1 | 9/2007 | Chiussi et al. |
| 2007/0244902 A1 | 10/2007 | Seide et al. |
| 2007/0253594 A1 | 11/2007 | Lu et al. |
| 2007/0255785 A1 | 11/2007 | Hayashi et al. |
| 2007/0268309 A1 | 11/2007 | Tanigawa et al. |
| 2007/0282826 A1 | 12/2007 | Hoeber et al. |
| 2007/0294295 A1 | 12/2007 | Finkelstein et al. |
| 2007/0298152 A1 | 12/2007 | Baets |
| 2008/0019614 A1 | 1/2008 | Robertson et al. |
| 2008/0040277 A1 | 2/2008 | DeWitt |
| 2008/0046406 A1 | 2/2008 | Seide et al. |
| 2008/0049629 A1 | 2/2008 | Morrill |
| 2008/0072256 A1 | 3/2008 | Boicey et al. |
| 2008/0091527 A1 | 4/2008 | Silverbrook et al. |
| 2008/0152231 A1 | 6/2008 | Gokturk et al. |
| 2008/0163288 A1 | 7/2008 | Ghosal et al. |
| 2008/0165861 A1 | 7/2008 | Wen et al. |
| 2008/0172615 A1 | 7/2008 | Igelman et al. |
| 2008/0201299 A1 | 8/2008 | Lehikoinen et al. |
| 2008/0201314 A1 | 8/2008 | Smith et al. |
| 2008/0204706 A1 | 8/2008 | Magne et al. |
| 2008/0228995 A1 | 9/2008 | Tan et al. |
| 2008/0237359 A1 | 10/2008 | Silverbrook et al. |
| 2008/0253737 A1 | 10/2008 | Kimura et al. |
| 2008/0263579 A1 | 10/2008 | Mears et al. |
| 2008/0270373 A1 | 10/2008 | Oostveen et al. |
| 2008/0307454 A1 | 12/2008 | Ahanger et al. |
| 2008/0313140 A1 | 12/2008 | Pereira et al. |
| 2009/0013414 A1 | 1/2009 | Washington et al. |
| 2009/0022472 A1 | 1/2009 | Bronstein et al. |
| 2009/0024641 A1 | 1/2009 | Quigley et al. |
| 2009/0037408 A1 | 2/2009 | Rodgers |
| 2009/0043637 A1 | 2/2009 | Eder |
| 2009/0043818 A1 | 2/2009 | Raichelgauz et al. |
| 2009/0089587 A1 | 4/2009 | Brunk et al. |
| 2009/0119157 A1 | 5/2009 | Dulepet |
| 2009/0125529 A1 | 5/2009 | Vydiswaran et al. |
| 2009/0125544 A1 | 5/2009 | Brindley |
| 2009/0148045 A1 | 6/2009 | Lee et al. |
| 2009/0157575 A1 | 6/2009 | Schobben et al. |
| 2009/0172030 A1 | 7/2009 | Schiff et al. |
| 2009/0175538 A1 | 7/2009 | Bronstein et al. |
| 2009/0204511 A1 | 8/2009 | Tsang |
| 2009/0216639 A1 | 8/2009 | Kapczynski et al. |
| 2009/0216761 A1 | 8/2009 | Raichelgauz et al. |
| 2009/0220138 A1 | 9/2009 | Zhang et al. |
| 2009/0226930 A1 | 9/2009 | Roep et al. |
| 2009/0245573 A1 | 10/2009 | Saptharishi et al. |
| 2009/0245603 A1 | 10/2009 | Koruga et al. |
| 2009/0253583 A1 | 10/2009 | Yoganathan |
| 2009/0254572 A1 | 10/2009 | Redlich et al. |
| 2009/0254824 A1 | 10/2009 | Singh |
| 2009/0259687 A1 | 10/2009 | Do et al. |
| 2009/0277322 A1 | 11/2009 | Cai et al. |
| 2009/0282218 A1 | 11/2009 | Raichelgauz et al. |
| 2010/0023400 A1 | 1/2010 | DeWitt |
| 2010/0042646 A1 | 2/2010 | Raichelgauz et al. |
| 2010/0082684 A1 | 4/2010 | Churchill et al. |
| 2010/0088321 A1 | 4/2010 | Solomon et al. |
| 2010/0104184 A1 | 4/2010 | Bronstein et al. |
| 2010/0106857 A1 | 4/2010 | Wyler |
| 2010/0125569 A1 | 5/2010 | Nair et al. |
| 2010/0162405 A1 | 6/2010 | Cook et al. |
| 2010/0173269 A1 | 7/2010 | Puri et al. |
| 2010/0191567 A1 | 7/2010 | Lee et al. |
| 2010/0198626 A1 | 8/2010 | Cho et al. |
| 2010/0268524 A1 | 10/2010 | Nath et al. |
| 2010/0306193 A1 | 12/2010 | Pereira et al. |
| 2010/0318493 A1 | 12/2010 | Wessling |
| 2010/0322522 A1 | 12/2010 | Wang et al. |
| 2010/0325138 A1 | 12/2010 | Lee et al. |
| 2011/0035289 A1 | 2/2011 | King et al. |
| 2011/0052063 A1 | 3/2011 | McAuley et al. |
| 2011/0055585 A1 | 3/2011 | Lee |
| 2011/0106782 A1 | 5/2011 | Ke et al. |
| 2011/0125727 A1 | 5/2011 | Zou et al. |
| 2011/0145068 A1 | 6/2011 | King et al. |
| 2011/0164810 A1 | 7/2011 | Zang et al. |
| 2011/0202848 A1 | 8/2011 | Ismalon |
| 2011/0208822 A1 | 8/2011 | Rathod |
| 2011/0246566 A1 | 10/2011 | Kashef et al. |
| 2011/0251896 A1 | 10/2011 | Impollonia et al. |
| 2011/0276680 A1 | 11/2011 | Rimon |
| 2011/0296315 A1 | 12/2011 | Lin et al. |
| 2011/0313856 A1 | 12/2011 | Cohen et al. |
| 2012/0082362 A1 | 4/2012 | Diem et al. |
| 2012/0131454 A1 | 5/2012 | Shah |
| 2012/0150890 A1 | 6/2012 | Jeong et al. |
| 2012/0167133 A1 | 6/2012 | Carroll et al. |
| 2012/0185445 A1 | 7/2012 | Borden et al. |
| 2012/0191686 A1 | 7/2012 | Hjelm et al. |
| 2012/0197857 A1 | 8/2012 | Huang et al. |
| 2012/0227074 A1 | 9/2012 | Hill et al. |
| 2012/0239690 A1 | 9/2012 | Asikainen et al. |
| 2012/0239694 A1 | 9/2012 | Avner et al. |
| 2012/0299961 A1 | 11/2012 | Ramkumar et al. |
| 2012/0301105 A1 | 11/2012 | Rehg et al. |
| 2012/0330869 A1 | 12/2012 | Durham |
| 2012/0331011 A1 | 12/2012 | Raichelgauz et al. |
| 2013/0031489 A1 | 1/2013 | Gubin et al. |
| 2013/0066856 A1 | 3/2013 | Ong et al. |
| 2013/0067035 A1 | 3/2013 | Amanat et al. |
| 2013/0067364 A1 | 3/2013 | Berntson et al. |
| 2013/0080433 A1 | 3/2013 | Raichelgauz et al. |
| 2013/0086499 A1 | 4/2013 | Dyor et al. |
| 2013/0089248 A1 | 4/2013 | Remiszewski et al. |
| 2013/0104251 A1 | 4/2013 | Moore et al. |
| 2013/0159298 A1 | 6/2013 | Mason et al. |
| 2013/0173635 A1 | 7/2013 | Sanjeev |
| 2013/0226930 A1 | 8/2013 | Arngren et al. |
| 2013/0311924 A1 | 11/2013 | Denker et al. |
| 2013/0325550 A1 | 12/2013 | Varghese et al. |
| 2013/0332951 A1 | 12/2013 | Gharaat et al. |
| 2014/0019264 A1 | 1/2014 | Wachman et al. |
| 2014/0025692 A1 | 1/2014 | Pappas |
| 2014/0147829 A1 | 5/2014 | Jerauld |
| 2014/0152698 A1 | 6/2014 | Kim et al. |
| 2014/0169681 A1 | 6/2014 | Drake |
| 2014/0176604 A1 | 6/2014 | Venkitaraman et al. |

(56) References Cited

U.S. PATENT DOCUMENTS

| | | |
|---|---|---|
| 2014/0188786 A1 | 7/2014 | Raichelgauz et al. |
| 2014/0193077 A1 | 7/2014 | Shiiyama et al. |
| 2014/0250032 A1 | 9/2014 | Huang et al. |
| 2014/0282655 A1 | 9/2014 | Roberts |
| 2014/0300722 A1 | 10/2014 | Garcia |
| 2014/0310825 A1 | 10/2014 | Raichelgauz et al. |
| 2014/0330830 A1 | 11/2014 | Raichelgauz et al. |
| 2014/0341476 A1 | 11/2014 | Kulick et al. |
| 2015/0154189 A1 | 6/2015 | Raichelgauz et al. |
| 2015/0254344 A1 | 9/2015 | Kulkarni et al. |
| 2015/0286742 A1 | 10/2015 | Zhang et al. |
| 2015/0289022 A1 | 10/2015 | Gross |
| 2016/0026707 A1 | 1/2016 | Ong et al. |
| 2016/0239566 A1 | 8/2016 | Raichelgauz et al. |

FOREIGN PATENT DOCUMENTS

| | | |
|---|---|---|
| WO | 2003067467 A1 | 8/2003 |
| WO | 2004019527 A1 | 3/2004 |
| WO | 2005027457 A1 | 3/2005 |
| WO | 20070049282 | 5/2007 |
| WO | 2014137337 A1 | 9/2014 |
| WO | 2016040376 A1 | 3/2016 |

OTHER PUBLICATIONS

Mladenovic, et al., "Electronic Tour Guide for Android Mobile Platform with Multimedia Travel Book", Telecommunications Forum (TELFOR), 2012 20th Year: 2012, pp. 1460-1463, DOI: 10.1109/TELFOR.2012.6419494 IEEE Conference Publications.

Park, et al., "Compact Video Signatures for Near-Duplicate Detection on Mobile Devices", Consumer Electronics (ISCE 2014), The 18th IEEE International Symposium on Year: 2014, pp. 1-2, DOI: 10.1109/ISCE.2014.6884293 IEEE Conference Publications.

Wang et al. "A Signature for Content-based Image Retrieval Using a Geometrical Transform", ACM 1998, pp. 229-234.

Zang, et al., "A New Multimedia Message Customizing Framework for Mobile Devices", Multimedia and Expo, 2007 IEEE International Conference on Year: 2007, pp. 1043-1046, DOI: 10.1109/ICME.2007.4284832 IEEE Conference Publications.

Clement, et al. "Speaker Diarization of Heterogeneous Web Video Files: A Preliminary Study", Acoustics, Speech and Signal Processing (ICASSP), 2011, IEEE International Conference on Year: 2011, pp. 4432-4435, DOI: 10.1109/ICASSP.2011.5947337 IEEE Conference Publications, France.

Gong, et al., "A Knowledge-based Mediator for Dynamic Integration of Heterogeneous Multimedia Information Sources", Video and Speech Processing, 2004, Proceedings of 2004 International Symposium on Year: 2004, pp. 467-470, DOI: 10.1109/ISIMP.2004.1434102 IEEE Conference Publications, Hong Kong.

Lin, et al., "Robust Digital Signature for Multimedia Authentication: A Summary", IEEE Circuits and Systems Magazine, 4th Quarter 2003, pp. 23-26.

Lin, et al., "Summarization of Large Scale Social Network Activity", Acoustics, Speech and Signal Processing, 2009, ICASSP 2009, IEEE International Conference on Year 2009, pp. 3481-3484, DOI: 10.1109/ICASSP.2009.4960375, IEEE Conference Publications, Arizona.

Nouza, et al., "Large-scale Processing, Indexing and Search System for Czech Audio-Visual Heritage Archives", Multimedia Signal Processing (MMSP), 2012, pp. 337-342, IEEE 14th Intl. Workshop, DOI: 10.1109/MMSP2012.6343465, Czech Republic.

Li, et al., "Matching Commercial Clips from TV Streams Using a Unique, Robust and Compact Signature," Proceedings of the Digital Imaging Computing: Techniques and Applications, Feb. 2005, vol. 0-7695-2467, Australia.

May et al., "The Transputer", Springer-Verlag, Berlin Heidelberg, 1989, teaches multiprocessing system.

Nam, et al., "Audio Visual Content-Based Violent Scene Characterization", Department of Electrical and Computer Engineering, Minneapolis, MN, 1998, pp. 353-357.

Vailaya, et al., "Content-Based Hierarchical Classification of Vacation Images," I.E.E.E.: Multimedia Computing and Systems, vol. 1, 1999, East Lansing, MI, pp. 518-523.

Whitby-Strevens, "The Transputer", 1985 IEEE, Bristol, UK.

Yanai, "Generic Image Classification Using Visual Knowledge on the Web," MM'03, Nov. 2-8, 2003, Tokyo, Japan, pp. 167-176.

Guo et al, "AdOn: An Intelligent Overlay Video Advertising System", SIGIR, Boston, Massachusetts, Jul. 19-23, 2009.

Mei, et al., "Contextual In-Image Advertising", Microsoft Research Asia, pp. 439-448, 2008.

Mei, et al., "VideoSense—Towards Effective Online Video Advertising", Microsoft Research Asia, pp. 1075-1084, 2007.

Semizarov et al. "Specificity of Short Interfering RNA Determined through Gene Expression Signatures", PNAS, 2003, pp. 6347-6352.

Brecheisen, et al., "Hierarchical Genre Classification for Large Music Collections", ICME 2006, pp. 1385-1388.

Lau, et al., "Semantic Web Service Adaptation Model for a Pervasive Learning Scenario", 2008 IEEE Conference on Innovative Technologies in Intelligent Systems and Industrial Applications Year: 2008, pp. 98-103, DOI: 10.1109/CITISIA.2008.4607342 IEEE Conference Publications.

McNamara, et al., "Diversity Decay in Opportunistic Content Sharing Systems", 2011 IEEE International Symposium on a World of Wireless, Mobile and Multimedia Networks Year: 2011, pp. 1-3, DOI: 10.1109/WoWMoM.2011.5986211 IEEE Conference Publications.

Santos, et al., "SCORM-MPEG: an Ontology of Interoperable Metadata for Multimedia and e-Learning", 2015 23rd International Conference on Software, Telecommunications and Computer Networks (SoftCOM) Year: 2015, pp. 224-228, DOI: 10.1109/SOFTCOM.2015.7314122 IEEE Conference Publications.

Milk, et al., "The Potential of Social-Aware Multimedia Prefetching on Mobile Devices", 2015 International Conference and Workshops on Networked Systems (NetSys) Year: 2015, pp. 1-5, DOI: 10.1109/NetSys.2015.7089081 IEEE Conference Publications.

Odinaev, et al., "Cliques in Neural Ensembles as Perception Carriers", Technion—Israel Institute of Technology, 2006 International Joint Conference on Neural Networks, Canada, 2006, pp. 285-292.

The International Search Report and the Written Opinion for PCT/US2016/054634 dated Mar. 16, 2017, ISA/RU, Moscow, RU.

International Search Authority: International Preliminary Report on Patentability (Chapter I of the Patent Cooperation Treaty) including "Written Opinion of the International Searching Authority"(PCT Rule 43bis. 1) for the related International Patent Application No. PCT/IL2006/001235; dated Jul. 28, 2009.

Boari et al, "Adaptive Routing for Dynamic Applications in Massively Parallel Architectures", 1995 IEEE, Spring 1995.

Burgsteiner et al.: "Movement Prediction From Real-World Images Using a Liquid State Machine", Innovations in Applied Artificial Intelligence Lecture Notes in Computer Science, Lecture Notes in Artificial Intelligence, LNCS, Springer-Verlag, BE, vol. 3533, Jun. 2005, pp. 121-130.

Cernansky et al., "Feed-forward Echo State Networks"; Proceedings of International Joint Conference on Neural Networks, Montreal, Canada, Jul. 31-Aug. 4, 2005.

Cococcioni, et al, "Automatic Diagnosis of Defects of Rolling Element Bearings Based on Computational Intelligence Techniques", University of Pisa, Pisa, Italy, 2009.

Emami, et al, "Role of Spatiotemporal Oriented Energy Features for Robust Visual Tracking in Video Surveillance, University of Queensland", St. Lucia, Australia, 2012.

Fathy et al., "A Parallel Design and Implementation for Backpropagation Neural Network Using NIMD Architecture", 8th Mediterranean Electrotechnical Corsfe rersce, 19'96. MELECON '96, Date of Conference: May 13-16, 1996, vol. 3, pp. 1472-1475.

Foote, Jonathan et al., "Content-Based Retrieval of Music and Audio"; 1997, Institute of Systems Science, National University of Singapore, Singapore (Abstract).

International Search Authority: "Written Opinion of the International Searching Authority" (PCT Rule 43bis. 1) including Interna-

(56) References Cited

OTHER PUBLICATIONS tional Search Report for the related International Patent Application No. PCT/US2008/073852; dated Jan. 28, 2009; Entire Document.
International Search Report for the related International Patent Application PCT/IL2006/001235; dated Nov. 2, 2008.
IPO Examination Report under Section 18(3) for corresponding UK application No. GB1001219.3, dated May 30, 2012.
Iwamoto, K.; Kasutani, E.; Yamada, A.: "Image Signature Robust to Caption Superimposition for Video Sequence Identification"; 2006 IEEE International Conference on Image Processing; pp. 3185-3188, Oct. 8-11, 2006; doi: 10.1109/ICIP.2006.313046.
Jaeger, H.: "The "echo state" approach to analysing and training recurrent neural networks", GMD Report, No. 148, 2001, pp. 1-43, XP002466251. German National Research Center for Information Technology.
Lin, C.; Chang, S.;, "Generating Robust Digital Signature for Image/Video Authentication, " Multimedia and Security Workshop at ACM Multimedia '98. Bristol, U.K. Sep. 1998, pp. 49-54.
Lyon, Richard F.; "Computational Models of Neural Auditory Processing"; IEEE International Conference on Acoustics, Speech, and Signal Processing, ICASSP '84, Date of Conference: Mar. 1984, vol. 9, pp. 41-44.
Maass, W. et al.: "Computational Models for Generic Cortical Microcircuits", Institute for Theoretical Computer Science, Technische Universitaet Graz, Graz, Austria, published Jun. 10, 2003.
Mandhaoui, et al, "Emotional Speech Characterization Based on Multi-Features Fusion for Face-to-Face Interaction", Universite Pierre et Marie Curie, Paris, France, 2009.
Marti et al, "Real Time Speaker Localization and Detection System for Camera Steering in Multiparticipant Videoconferencing Environments", Universidad Politecnica de Valencia, Spain, 2011.
Morad, T.Y. et al.: "Performance, Power Efficiency and Scalability of Asymmetric Cluster Chip Multiprocessors", Computer Architecture Letters, vol. 4, Jul. 4, 2005 (Jul. 4, 2005), pp. 1-4, XP002466254.
Nagy et al, "A Transputer, Based, Flexible, Real-Time Control System for Robotic Manipulators", UKACC International Conference on CONTROL '96, Sep. 2-5, 1996, Conference 1996, Conference Publication No. 427, IEE 1996.
Natsclager, T. et al.: "The "liquid computer": A novel strategy for real-time computing on time series", Special Issue on Foundations of Information Processing of Telematik, vol. 8, No. 1, 2002, pp. 39-43, XP002466253.
Ortiz-Boyer et al., "CIXL2: A Crossover Operator for Evolutionary Algorithms Based on Population Features", Journal of Artificial Intelligence Research 24 (2005) 1-48 Submitted Nov. 2004; published Jul. 2005.
Raichelgauz, I. et al.: "Co-evolutionary Learning in Liquid Architectures", Lecture Notes in Computer Science, [Online] vol. 3512, Jun. 21, 2005 (Jun. 21, 2005), pp. 241-248, XP019010280 Springer Berlin / Heidelberg ISSN: 1611-3349 ISBN: 978-3-540-26208-4.
Ribert et al. "An Incremental Hierarchical Clustering", Visicon Interface 1999, pp. 586-591.
Scheper, et al. "Nonlinear dynamics in neural computation", ESANN'2006 proceedings—European Symposium on Artificial Neural Networks, Bruges (Belgium), Apr. 26-28, 2006, d-side publi, ISBN 2-930307-06-4.
Theodoropoulos et al, "Simulating Asynchronous Architectures on Transputer Networks", Proceedings of the Fourth Euromicro Workshop on Parallel and Distributed Processing, 1996. PDP '96.
Verstraeten et al., "Isolated word recognition with the Liquid State Machine; a case study"; Department of Electronics and Information Systems, Ghent University, Sint-Pietersnieuwstraat 41, 9000 Gent, Belgium, Available online Jul. 14, 2005; Entire Document.
Verstraeten et al.: "Isolated word recognition with the Liquid State Machine; a case study", Information Processing Letters, Amsterdam, NL, col. 95, No. 6, Sep. 30, 2005 (Sep. 30, 2005), pp. 521-528, XP005028093 ISSN: 0020-0190.
Xian-Sheng Hua et al.: "Robust Video Signature Based on Ordinal Measure" In: 2004 International Conference on Image Processing, ICIP '04; Microsoft Research Asia, Beijing, China; published Oct. 24-27, 2004, pp. 685-688.
Zeevi, Y. et al.: "Natural Signal Classification by Neural Cliques and Phase-Locked Attractors", IEEE World Congress on Computational Intelligence, IJCNN2006, Vancouver, Canada, Jul. 2006 (Jul. 2006), XP002466252.
Zhou et al., "Ensembling neural networks: Many could be better than all"; National Laboratory for Novel Software Technology, Nanjing Unviersirty, Hankou Road 22, Nanjing 210093, PR China; Received Nov. 16, 2001, Available online Mar. 12, 2002.
Zhou et al., "Medical Diagnosis With C4.5 Rule Preceded by Artificial Neural Network Ensemble"; IEEE Transactions on Information Technology in Biomedicine, vol. 7, Issue: 1, pp. 37-42, Date of Publication: Mar. 2003.
Chuan-Yu Cho, et al., "Efficient Motion-Vector-Based Video Search Using Query by Clip", 2004, IEEE, Taiwan, pp. 1-4.
Gomes et al., "Audio Watermaking and Fingerprinting: For Which Applications?" University of Rene Descartes, Paris, France, 2003.
Ihab Al Kabary, et al., "SportSense: Using Motion Queries to Find Scenes in Sports Videos", Oct. 2013, ACM, Switzerland, pp. 1-3.
Jianping Fan et al., "Concept-Oriented Indexing of Video Databases: Towards Semantic Sensitive Retrieval and Browsing", IEEE, vol. 13, No. 7, Jul. 2004, pp. 1-19.
Shih-Fu Chang, et al., "VideoQ: A Fully Automated Video Retrieval System Using Motion Sketches", 1998, IEEE, , New York, pp. 1-2.
Wei-Te Li et al., "Exploring Visual and Motion Saliency for Automatic Video Object Extraction", IEEE, vol. 22, No. 7, Jul. 2013, pp. 1-11.
Zhu et al., Technology-Assisted Dietary Assessment. Computational Imaging VI, edited by Charles A. Bouman, Eric L. Miller, Ilya Pollak, Proc. of SPIE-IS&T Electronic Imaging, SPIE vol. 6814, 681411, Copyright 2008 SPIE-IS&T. pp. 1-10.
Johnson, John L., "Pulse-Coupled Neural Nets: Translation, Rotation, Scale, Distortion, and Intensity Signal Invariance for Images." Applied Optics, vol. 33, No. 26, 1994, pp. 6239-6253.
The International Search Report and the Written Opinion for PCT/US2016/050471, ISA/RU, Moscow, RU, dated May 4, 2017.
The International Search Report and the Written Opinion for PCT/US2017/015831, ISA/RU, Moscow, Russia, dated Apr. 20, 2017.
Zou, et al., "A Content-Based Image Authentication System with Lossless Data Hiding", ICME 2003, pp. 213-216.
Hua, et al., "Robust Video Signature Based on Ordinal Measure", Image Processing, 2004. 2004 International Conference on Image Processing (ICIP), vol. 1, IEEE, pp. 685-688, 2004.
Queluz, "Content-Based Integrity Protection of Digital Images", SPIE Conf. on Security and Watermarking of Multimedia Contents, San Jose, Jan. 1999, pp. 85-93, downloaded from http://proceedings.spiedigitallibrary.org/ on Aug. 2, 2017.
Schneider, et. al., "A Robust Content Based Digital Signature for Image Authentication", Proc. ICIP 1996, Laussane, Switzerland, Oct. 1996, pp. 227-230.
Yanagawa, et al., "Columbia University's Baseline Detectors for 374 LSCOM Semantic Visual Concepts." Columbia University Advent technical report, 2007, pp. 222-2006-8.
Zhu et al., "Technology-Assisted Dietary Assesment", Proc SPIE. Mar. 20, 2008, pp. 1-15.
Hogue, "Tree Pattern Inference and Matching for Wrapper Induction on the World Wide Web", Master's Thesis, Massachusetts institute of Technology, 2004, pp. 1-106.
Marian Stewart B et al., "Independent component representations for face recognition", Proceedings of the SPIE Symposium on Electronic Imaging: Science and Technology; Conference on Human Vision and Electronic Imaging, San Jose, California, Jan. 1998, pp. 1-12.
Vallet et al., "Personalized Content Retrieval in Context Using Ontological Knowledge", IEEE Transactions on Circuits and Systems for Video Technology, vol. 17, No. 3, Mar. 2007. pp. 336-346.
Li et al., "Matching Commercial Clips from TV Streams Using a Unigue, Robust and Compact Signature", IEEE 2005, pp. 1-8.

(56) References Cited

OTHER PUBLICATIONS

Big Bang Theory Series 04 Episode 12, aired Jan. 6, 2011; [retrieved from Internet: <https://bigbangtrans.wordpress.com/series-4-episode-12-the-bus-pants-utilization/>].

Wang et al., "Classifying Objectionable Websites Based onImage Content", Stanford University, pp. 1-12.

Ware et al, "Locating and Identifying Components in a Robot's Workspace using a Hybrid Computer Architecture" Proceedings of the 1995 IEEE International Symposium on Intelligent Control, Aug. 27-29, 1995, pp. 139-144.

Ortiz-Boyer et al, "CIXL2: A Crossover Operator for Evolutionary Algorithms Based on Population Features", Journal of Artificial Intelligence Research 24 (2005) Submitted Nov. 2004; published Jul. 5, pp. 1-48.

Scheper et al, "Nonlinear dynamics in neural computation", ESANN'2006 proceedings—European Symposium on Artificial Neural Networks, Bruges (Belgium), Apr. 26-28, 2006, d-side publication, ISBN 2-930307-06-4, pp. 1-12.

Lyon, "Computational Models of Neural Auditory Processing", IEEE International Conference on Acoustics, Speech, and Signal Processing, ICASSP '84, Date of Conference: Mar. 1984, vol. 9, pp. 41-44.

Boari et al, "Adaptive Routing for Dynamic Applications in Massively Parallel Architectures", 1995 IEEE, Spring 1995, pp. 1-14.

Cernansky et al, "Feed-forward Echo State Networks", Proceedings of International Joint Conference on Neural Networks, Montreal, Canada, Jul. 31-Aug. 4, 2005, pp. 1-4.

Fathy et al, "A Parallel Design and Implementation for Backpropagation Neural Network Using MIMD Architecture", 8th Mediterranean Electrotechnical Conference, 19'96. MELECON '96, Date of Conference: May 13-16, 1996, vol. 3 pp. 1472-1475, vol. 3.

Freisleben et al, "Recognition of Fractal Images Using a Neural Network", Lecture Notes in Computer Science, 1993, vol. 6861, 1993, pp. 631-637.

Garcia, "Solving the Weighted Region Least Cost Path Problem Using Transputers", Naval Postgraduate School, Monterey, California, Dec. 1989.

Howlett et al, "A Multi-Computer Neural Network Architecture in a Virtual Sensor System Application", International journal of knowledge-based intelligent engineering systems, 4 (2). pp. 86-93, 133N 1327-2314.

May et al, "The Transputer", Springer-Verlag Berlin Heidelberg 1989, vol. 41.

Nagy et al, "A Transputer, Based, Flexible, Real-Time Control System for Robotic Manipulators", UKACC International Conference on Control '96, Sep. 2-5, 1996, Conference Publication No. 427, IEE 1996.

Theodoropoulos et al, "Simulating Asynchronous Architectures on Transputer Networks", Proceedings of the Fourth Euromicro Workshop on Parallel and Distributed Processing, 1996. PDP '96, pp. 274-281.

Verstraeten et al, "Isolated word recognition with the Liquid State Machine: a case study", Department of Electronics and Information Systems, Ghent University, Sint-Pietersnieuwstraat 41, 9000 Gent, Belgium, Available onlline Jul. 14, 2005, pp. 521-528.

Whitby-Strevens, "The transputer", 1985 IEEE, pp. 292-300.

Zhou et al, "Ensembling neural networks: Many could be better than all", National Laboratory for Novel Software Technology, Nanjing University, Hankou Road 22, Nanjing 210093, PR China Received Nov. 16, 2001, Available online Mar. 12, 2002, pp. 239-263.

Zhou et al, "Medical Diagnosis With C4.5 Rule Preceded by Artificial Neural Network Ensemble", IEEE Transactions Information Technology in Biomedicine, vol. 7, Issue: 1, Mar. 2003, pp. 37-42.

Hua et al., "Robust Video Signature Based on Ordinal Measure", International Conference on Image Proceesing (ICIP), 2004 IEEE, pp. 685-688.

Yanagawa et al, "Columbia University's Baseline Detectors for 374 LSCOM Semantic Visual Concepts", Columbia University Advent Technical Report # 222-2006-8, Mar. 20, 2007, pp. 1-17.

Lu et al, "Structural Digital Signature for Image Authentication: An Incidental Distortion Resistant Scheme", IEEE Transactions on Multimedia, vol. 5, No. 2, Jun. 2003, pp. 161-173.

Stolberg et al, "Hibrid-Soc: a Mul Ti-Core Soc Architecture for Mul Timedia Signal Processing", 2003 IEEE, pp. 189-194.

Srihari et al., "Intelligent Indexing and Semantic Retrieval of Multimodal Documents", Kluwer Academic Publishers, May 2000, vol. 2, Issue 2-3, pp. 245-275.

Lin et al. "Generating robust digital signature for image/video authentication", Multimedia and Security Workshop at ACM Multimedia '98, Bristol, U.K., Sep. 1998, pp. 245-251.

* cited by examiner

SYSTEM AND METHOD FOR GENERATING AN ADVERTISEMENT EFFECTIVENESS PERFORMANCE SCORE

CROSS-REFERENCE TO RELATED APPLICATIONS

This application claims the benefit of U.S. Provisional Application No. 61/939,290 filed on Feb. 13, 2014. This application is a continuation-in-part (CIP) of U.S. patent application Ser. No. 13/770,603 filed on Feb. 19, 2013, now pending, which is a CIP of U.S. patent application Ser. No. 13/624,397 filed on Sep. 21, 2012, now pending. The Ser. No. 13/624,397 application is a CIP of:

(a) U.S. patent application Ser. No. 13/344,400 filed on Jan. 5, 2012, now pending, which is a continuation of U.S. patent application Ser. No. 12/434,221, filed May 1, 2009, now U.S. Pat. No. 8,112,376;

(b) U.S. patent application Ser. No. 12/195,863, filed Aug. 21, 2008, now U.S. Pat. No. 8,326,775, which claims priority under 35 USC 119 from Israeli Application No. 185414, filed on Aug. 21, 2007, and which is also a continuation-in-part of the below-referenced U.S. patent application Ser. No. 12/084,150; and, (c) U.S. patent application Ser. No. 12/084,150 having a filing date of Apr. 7, 2009, now U.S. Pat. No. 8,655,801, which is the National Stage of International Application No. PCT/IL2006/001235, filed on Oct. 26, 2006, which claims foreign priority from Israeli Application No. 171577 filed on Oct. 26, 2005, and Israeli Application No. 173409 filed on Jan. 29, 2006.

All of the applications referenced above are herein incorporated by reference for all that they contain.

TECHNICAL FIELD

The present disclosure relates generally to the analysis of multimedia content displayed in a webpage, and more specifically to a system for generating an advertisement effectiveness performance score respective of multimedia content elements displayed in a webpage.

BACKGROUND

The Internet, also referred to as the worldwide web (WWW), has become a mass media content platform where the content presentation is largely supported by paid advertisements that are added to webpage content. Typically, advertisements are displayed using portions of code written in, for example, hyper-text mark-up language (HTML) or JavaScript that is inserted into, or otherwise called up by, documents also written in HTML and which are sent to a user node for display. A webpage typically contains text and multimedia elements that are intended for display on the user's display device.

One of the most common types of advertisements on the Internet is in a form of a banner advertisement. Banner advertisements are generally images or animations that are displayed within a webpage. Other advertisements are simply inserted at various locations within the display area of the document. A typical webpage displayed today is cluttered with many advertisements, which frequently are irrelevant to the content being displayed, and as a result the user's attention is not given to them. When each user's attention is not given to advertisements, the click-rate of these advertisements as well as the conversion rate decrease and, as a result, the advertising value of these advertisements decrease. Consequently, the advertising price of a potentially valuable display area may be low because its respective effectiveness is low.

In the context of advertising, many techniques are used to ensure that viewers of the advertisement are more likely to be paying attention to the advertisement. In particular, advertisers often provide advertisements to target audiences that are likely to be interested in the product and, therefore, will likely pay more attention to the advertisement than the average consumer. To this end, advertisers may seek to insert their advertisements into content (or on webpages containing such content) that they believe their target audiences will view and engage with.

Advertisers are more likely to believe such modification is worthwhile if, e.g., the advertisers know that certain types of advertisements are more likely to be viewed by a particular audience than for other audiences. For example, an audience viewing a blog with travel tips for vacation may be more inclined to pay attention to advertisements for plane tickets or services than the typical audience. With the advent of the Internet, new content can come out much more frequently than with content provided by other mediums such as television or radio. Such sites can potentially have hundreds, thousands, or even millions of items of content uploaded daily. Further, the number of potential views of such content can reach its peak in a very short amount of time. Consequently, quickly and efficiently determining effective placements for advertisements for web-based content has become increasingly important. As such, it would be useful for advertisers to be able to obtain information regarding the relation of the advertisement to webpages and content contained therein and, particularly, whether the advertisement and such content overlaps sufficiently that advertising would be worthwhile to the advertisers.

Existing solutions typically often require advertisers to perform significant market research to determine the most effective advertisements. Additionally, advertisers are often required to provide advertisements respective of hosts of webpages rather than based on specific content contained within webpages. However, advertisers would generally prefer to provide advertisements that are tailored or otherwise more related to the particular multimedia content presented on webpages.

It would therefore be advantageous to provide a solution that would determine advertisement effectiveness score of multimedia content elements when displayed with a reference to advertisements.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all aspects nor delineate the scope of any or all embodiments. Its sole purpose is to present some concepts of one or more embodiments in a simplified form as a prelude to the more detailed description that is presented later. For convenience, the term some embodiments may be used herein to refer to a single embodiment or multiple embodiments of the disclosure.

Certain embodiments include a method for generating an advertisement effectiveness performance score of a multimedia content element displayed in a webpage. The method comprises determining an advertisement context of an advertisement; analyzing metadata associated with at least one prior advertisement to determine a prior advertisement success score; determining a multimedia context of the multimedia content element displayed in the webpage; matching the advertisement context to the multimedia context to determine a context matching score; and generating an advertisement effectiveness score at least based on the prior advertisement success score and the context matching score.

Certain embodiments include a system for generating an advertisement effectiveness performance score of multimedia content elements displayed in a webpage. The method comprises a processing unit; and a memory, the memory containing instructions that when, executed by the processing unit, configured the system to: determine an advertisement context of an advertisement; analyze metadata associated with at least one prior advertisement to determine a prior advertisement success score; determine a multimedia context of the multimedia content element displayed in the webpage; match the advertisement context to the multimedia context to determine a context matching score; and generate an advertisement effectiveness score at least based on the prior advertisement success score and the context matching score.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
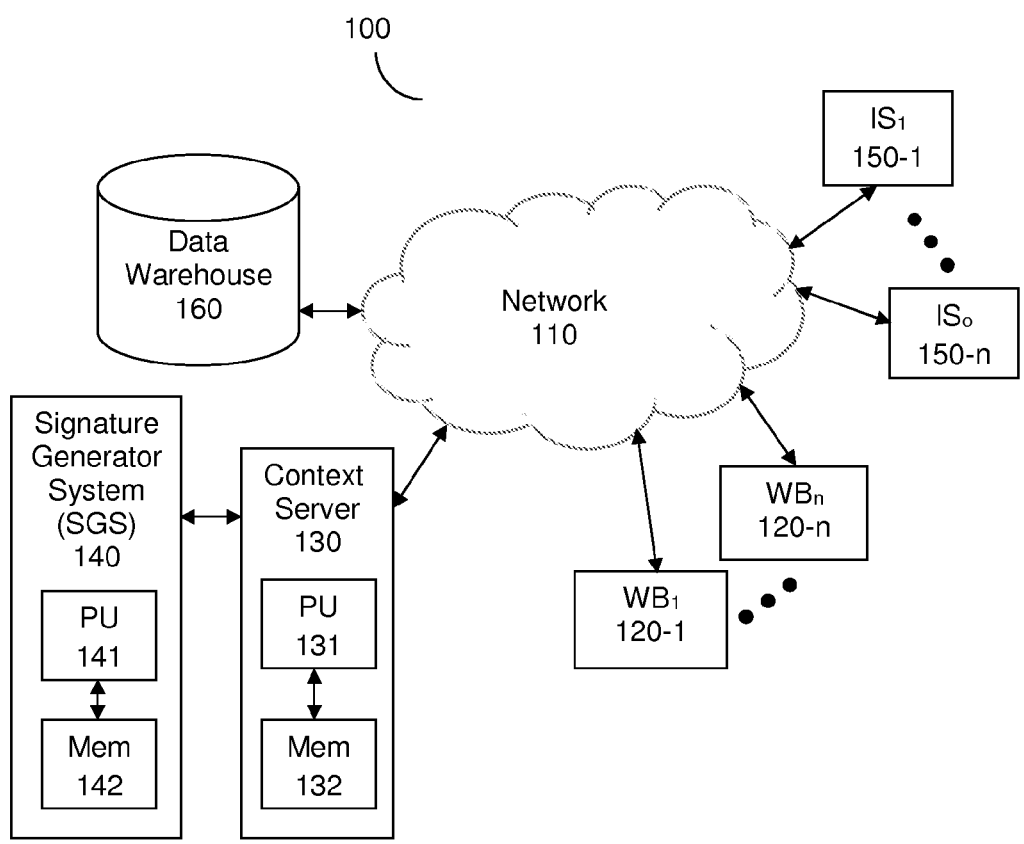
FIG. 1 is a schematic block diagram of a network system utilized to describe the various embodiments disclosed herein.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Certain exemplary embodiments disclosed herein include a system and method for generating an advertisement effectiveness performance score to multimedia content elements embedded, for example, in a webpage. Accordingly, one or more multimedia content elements embedded in a webpage are analyzed and at least one signature is generated for such element. Then, the signatures are analyzed to determine the concept of each of the signatures and the context of each of the multimedia content elements respective thereto.

Metadata is also received respective of the multimedia content elements. The metadata includes at least one of: a number of clicks over the multimedia content elements, impressions, the content type of each multimedia content element, a combination thereof, and so on. The metadata can be used to identify the advertisement effectiveness of the multimedia content element(s). The metadata is analyzed respective of the context determined for multimedia content elements and an advertisement effectiveness performance score is generated for each multimedia content element respective of the analysis. The advertisement effectiveness performance scores may be stored in a data warehouse.

FIG. 1 shows an exemplary and non-limiting schematic diagram of a network system 100 utilized to describe the various embodiments disclosed herein. A network 110 is used to communicate between different parts of the system 100. The network 110 may be the Internet, the world-wide-web (WWW), a local area network (LAN), a wide area network (WAN), a metro area network (MAN), and other network capable of enabling communication between the elements of the system 100.

Further connected to the network 110 are one or more client applications, such as web browsers (WB) 120-1 through 120-n (hereinafter referred to collectively as web browsers 120 or individually as a web browser 120). A web browser 120 is executed over a computing device such as, for example, a personal computer (PC), a personal digital assistant (PDA), a mobile phone, a smart phone, a tablet computer, a wearable computing device, and other kinds of wired and mobile appliances, equipped with browsing, viewing, listening, filtering, and managing capabilities, etc., that are enabled as further discussed herein below.

The system 100 also includes a plurality of information sources 150-1 through 150-m (hereinafter referred to collectively as information sources 150 or individually as an information source 150) connected to the network 110. Each of the information sources 150 may be, for example, a web server, an application server, a publisher server, an ad-serving system, a data repository, a database, and the like. Also connected to the network 110 is a data warehouse 160 configured to store multimedia content elements, clusters of multimedia content elements, and the context determined for a webpage as identified by its URL. In the embodiment illustrated in FIG. 1, a context server 130 is configured to communicate with the data warehouse 160 through the network 110. In other non-limiting configurations, the context sever 130 is directly connected to the data warehouse 160.

The various embodiments disclosed herein are realized using the context server 130 and a signature generator system (SGS) 140. The SGS 140 may be connected to the context server 130 directly (as shown in FIG. 1) or through the network 110 (not shown). The context server 130 is enabled to receive and serve multimedia content elements and causes the SGS 140 to generate a signature respective of the multimedia content elements. The process for generating signatures for multimedia content is explained in more detail herein below with respect to FIGS. 3 and 4. It should be noted that each of the context server 130 and the SGS 140 typically comprises a processing unit (e.g., the processing units 131 and 141, respectively), such as a processor, that is coupled to a memory (e.g., the memories 132 and 142, respectively). The memory 132 and the memory 142 contain instructions that can be executed by the processing unit 131 and the processing unit 141, respectively. The context server 130 also includes an interface to the network 110.

Each processing unit may comprise, or be a component of, a larger processing unit implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

Each processing unit may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing unit, cause the processing unit to perform the various functions described herein. In another embodiment, the processing unit may be realized as an array of computational cores.

According to the disclosed embodiments, the context server 130 is configured to receive at least a URL of a webpage hosted in an information source 150 and accessed by a web browser 120. The context server 130 is further configured to analyze the multimedia content elements contained in the webpage to determine their context, thereby ascertaining the context of the webpage. The analysis is performed based on at least one signature generated for each multimedia content element. It should be noted that the context of an individual multimedia content element or a group of multimedia content elements may be extracted from the webpage, received from a user of a web browser 120 (e.g., uploaded video clip), or retrieved from the data warehouse 160.

According to the embodiments disclosed herein, a user visits a webpage using a web browser 120. When the webpage is uploaded on the user's web browser 120, a request is sent to the context server 130 to analyze the multimedia content elements contained in the webpage. The request to analyze the multimedia content elements, and therefore the advertising effectiveness performance score, can be generated and sent by a script executed in the webpage, an agent installed in the web browser, or by one of the information sources 150 (e.g., a web server or a publisher server) when requested to upload one or more advertisements to the webpage. The request to analyze the multimedia content may include a URL of the webpage or a copy of the webpage. In one embodiment, the request may include multimedia content elements extracted from the webpage. A multimedia content element may include, for example, an image, a graphic, a video stream, a video clip, an audio stream, an audio clip, a video frame, a photograph, and an image of signals (e.g., spectrograms, phasograms, scalograms, etc.), and/or combinations thereof and portions thereof.

The context server 130 is configured to analyze the multimedia content elements in the webpage to determine their context. For example, if the webpage contains images of palm trees, a beach, and the coast line of San Diego, the context of the webpage may be determined to be "California sea shore." According to one embodiment, the determined context can be utilized to detect one or more matching advertisements for the multimedia content elements. According to this embodiment, the SGS 140 is configured to generate at least one signature for each multimedia content element provided by the context server 130. The generated signature(s) may be robust to noise and distortion as discussed further herein below with respect to FIGS. 3 and 4.

Using the generated signature(s), the context server 130 is configured to determine the context of the elements and search the data warehouse 160 for a matching advertisement based on the context. For example, if the signature of an image indicates a "California sea shore", then an advertisement for a swimsuit, a beach towel, or a California vacation can be potential matching advertisements.

It should be noted that using signatures for determining the context and for the searching of advertisements ensures more accurate reorganization of multimedia content than, for example, when using metadata. For instance, in order to provide a matching advertisement for a sports car, it may be desirable to locate a car of a particular model. However, in most cases the model of the car would not be part of the metadata associated with the multimedia content (an image). Moreover, the car shown in an image may be at angles different from the angles of a specific photograph of the car that is available as a search item. The signature generated for that image would enable accurate recognition of the model of the car because the signatures generated for the multimedia content elements, according to the disclosed embodiments, allow for recognition and classification of multimedia content elements such as, but not limited to, content-tracking, video filtering, multimedia taxonomy generation, video fingerprinting, speech-to-text, audio classification, element recognition, video/image search, and any other application requiring content-based signatures generation and matching for large content volumes such as, web and other large-scale databases.

In one embodiment, the signatures generated for more than one multimedia content element are clustered. The clustered signatures are used to determine the context of the webpage and to search for a matching advertisement. The one or more selected matching advertisements are retrieved from the data warehouse 160 and uploaded to the webpage on the web browser 120.

Figure 2:
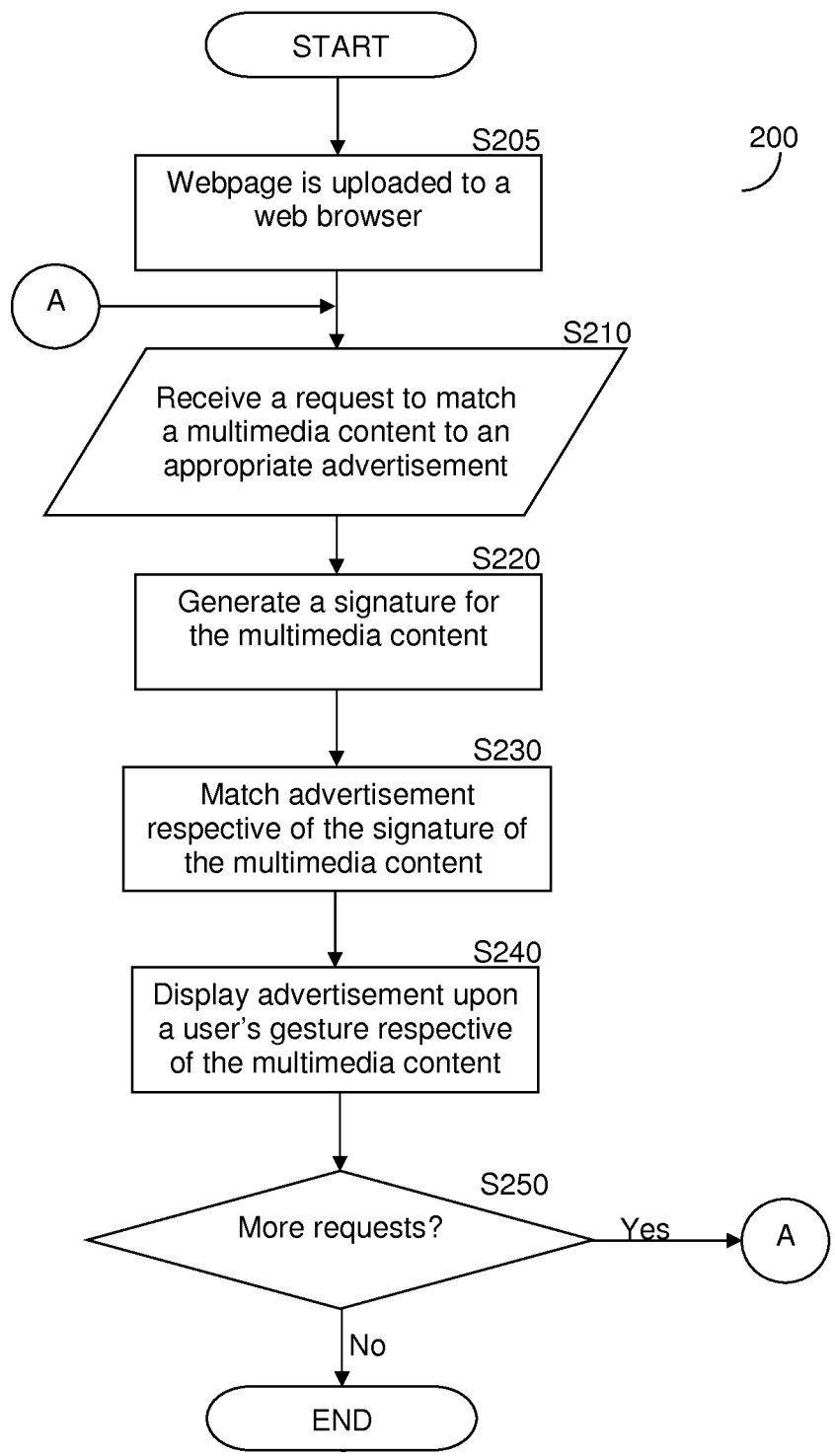
FIG. 2 is a flowchart describing the process of matching an advertisement to multimedia content displayed on a webpage.

FIG. 2 depicts an exemplary and non-limiting flowchart 200 describing the process of matching an advertisement to multimedia content displayed on a webpage. In S205, a webpage is uploaded to a web browser (e.g., the web browser 120-1). In S210, a request to match at least one multimedia content element contained in the uploaded webpage to an appropriate advertisement is received. The request can be received from a publisher server, a script running on the uploaded webpage, or an agent (e.g., an add-on) installed in the web browser. S210 can also include extracting the multimedia content elements for a signature that should be generated.

In S220, at least one signature is generated for the multimedia content element executed from the webpage. The signature for the multimedia content element is generated by a signature generator (e.g., the SGS 140) as described further herein below with respect to FIGS. 3 and 4. In an embodiment, based on the generated signatures, the context of the extracted multimedia content elements, and thus the context of the webpage, is determined as described further herein below with respect to FIG. 6.

In S230, an advertisement item is matched to the multimedia content element respective of its generated signatures and/or the determined context. According to one embodiment, the matching process includes searching for at least one advertisement based on the signature of the multimedia content and a display of the at least one advertisement item within the display area of the webpage. According to another embodiment, the signatures generated for the multimedia content elements are clustered and the cluster of signatures is matched to one or more advertisements. According to yet another embodiment, the matching of an advertisement to a multimedia content element can be performed by computational cores that are part of a large scale matching system as discussed in further detail herein below with respect to FIGS. 3 and 4.

In S240, upon identification of a user gesture, the matching advertisement is uploaded to the webpage and displayed therein. The user gesture may be, but is not limited to, a scroll on the multimedia content element, a press on the multimedia content element, and/or a response to the multimedia content. Uploading the matching advertisement only upon identifying a user gesture ensures that the user's attention is given to the advertised content. In S250, it is determined whether there are additional requests to analyze multimedia content elements, and if so, execution continues with S210; otherwise, execution terminates.

As a non-limiting example, an image that contains a plurality of multimedia content elements is identified in an uploaded webpage. At least one signature is generated for each multimedia content element executed in the webpage. According to this embodiment, a printer and a scanner are shown in the image, and signatures are generated respective thereto. The context of the image is determined to be "office equipment." Therefore, at least one advertisement that is suitable for users viewing content related to office equipment is matched to the multimedia content element.

Figure 3:
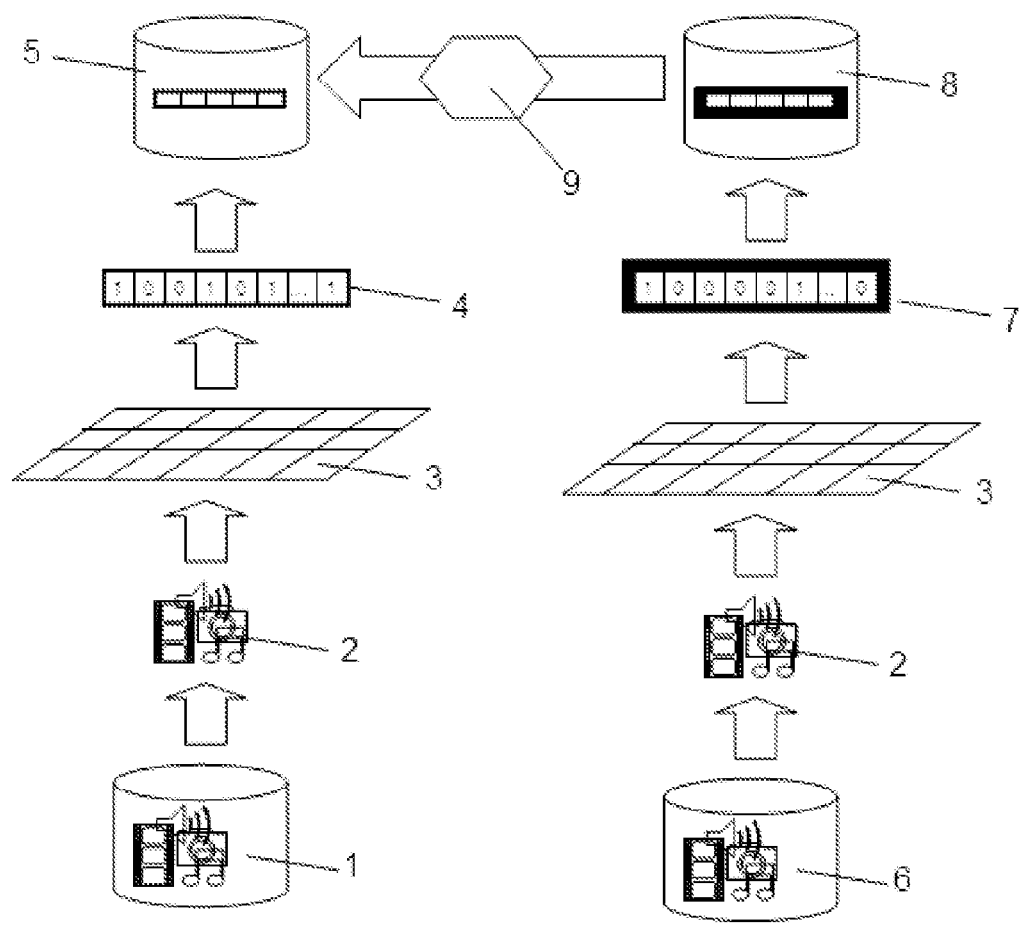
FIG. 3 is a block diagram depicting the basic flow of information in the signature generator system.
Figure 4:
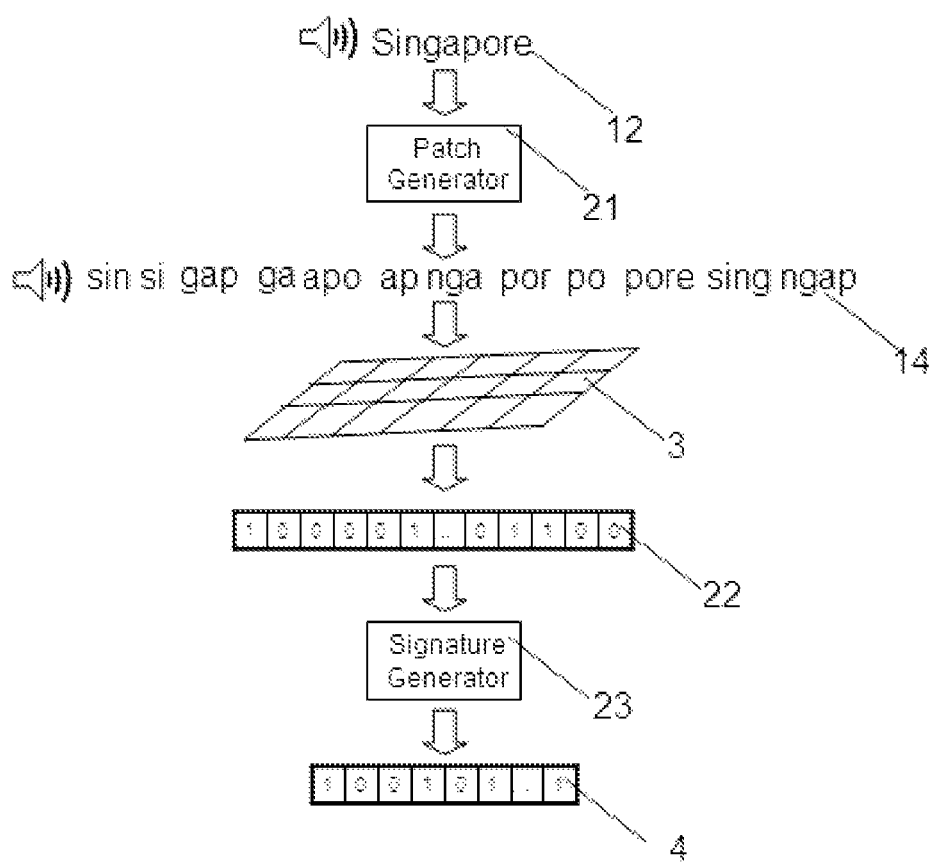
FIG. 4 is a diagram showing the flow of patches generation, response vector generation, and signature generation in a large-scale speech-to-text system.

FIGS. 3 and 4 illustrate the generation of signatures for the multimedia content elements according to one embodiment. An exemplary high-level description of the process for large scale matching is depicted in FIG. 3. In this example, the matching is for video content.

Video content segments 2 from a Master database (DB) 6 and a Target DB 1 are processed in parallel by a large number of independent computational Cores 3 that constitute an architecture for generating the Signatures (hereinafter the "Architecture"). Further details on the computational Cores generation are provided below. The independent Cores 3 generate a database of Robust Signatures and Signatures 4 for Target content-segments 5 and a database of Robust Signatures and Signatures 7 for Master content-segments 8. An exemplary and non-limiting process of signature generation for an audio component is shown in detail in FIG. 4. Finally, Target Robust Signatures and/or Signatures are effectively matched, by a matching algorithm 9, to Master Robust Signatures and/or Signatures database to find all matches between the two databases.

To demonstrate an example of the signature generation process, it is assumed, merely for the sake of simplicity and without limitation on the generality of the disclosed embodiments, that the signatures are based on a single frame, leading to certain simplification of the computational cores generation. The Matching System is extensible for signatures generation capturing the dynamics in-between the frames.

The Signatures' generation process is now described with reference to FIG. 4. The first step in the process of signatures generation from a given speech-segment is to breakdown the speech-segment to K patches 14 of random length P and random position within the speech segment 12. The breakdown is performed by the patch generator component 21. The value of the number of patches K, random length P and random position parameters is determined based on optimization, considering the tradeoff between accuracy rate and the number of fast matches required in the flow process of the context server 130 and SGS 140. Thereafter, all the K patches are injected in parallel into all computational Cores 3 to generate K response vectors 22, which are fed into a signature generator system 23 to produce a database of Robust Signatures and Signatures 4.

In order to generate Robust Signatures, i.e., Signatures that are robust to additive noise L (where L is an integer equal to or greater than 1) by the Computational Cores 3 a frame 'i' is injected into all the Cores 3. Then, Cores 3 generate two binary response vectors: $\vec{S}$ which is a Signature vector, and $\vec{RS}$ which is a Robust Signature vector.

For generation of signatures robust to additive noise, such as White-Gaussian-Noise, scratch, etc., but not robust to distortions, such as crop, shift and rotation, etc., a core Ci={ni} (1≤i≤L) may consist of a single leaky integrate-to-threshold unit (LTU) node or more nodes. The node ni equations are:

$$V_i = \sum_j w_{ij} k_j$$

$$n_i = \Pi(Vi - Th_x)$$

where, $\Pi$ is a Heaviside step function; $w_{ij}$ is a coupling node unit (CNU) between node i and image component j (for example, grayscale value of a certain pixel j); $k_j$ is an image component 'j' (for example, grayscale value of a certain pixel j); Thx is a constant Threshold value, where 'x' is 'S' for Signature and 'RS' for Robust Signature; and Vi is a Coupling Node Value.

The Threshold values Thx are set differently for Signature generation and for Robust Signature generation. For example, for a certain distribution of Vi values (for the set of nodes), the thresholds for Signature ($Th_S$) and Robust Signature ($Th_{RS}$) are set apart, after optimization, according to at least one or more of the following criteria:

1: For: $V_i > Th_{RS}$
   $1 - p(V > Th_S) - 1 - (1-\varepsilon)^l \ll 1$ i.e., given that l nodes (cores) constitute a Robust Signature of a certain image I, the probability that not all of these I nodes will belong to the Signature of same, but noisy image, Ĩ is sufficiently low (according to a system's specified accuracy).

2: $p(V_i > Th_{RS}) \approx l/L$ i.e., approximately l out of the total L nodes can be found to generate a Robust Signature according to the above definition.

3: Both Robust Signature and Signature are generated for certain frame i.

It should be understood that the generation of a signature is unidirectional, and typically yields lossless compression, where the characteristics of the compressed data are maintained but the uncompressed data cannot be reconstructed. Therefore, a signature can be used for the purpose of comparison to another signature without the need of comparison to the original data. The detailed description of the Signature generation can be found in U.S. Pat. Nos. 8,326,775 and 8,312,031, assigned to common assignee, which are hereby incorporated by reference for all the useful information they contain.

A Computational Core generation is a process of definition, selection, and tuning of the parameters of the cores for a certain realization in a specific system and application. The process is based on several design considerations, such as:

(a) The Cores should be designed so as to obtain maximal independence, i.e., the projection from a signal space should generate a maximal pair-wise distance between any two cores' projections into a high-dimensional space.

(b) The Cores should be optimally designed for the type of signals, i.e., the Cores should be maximally sensitive to the spatio-temporal structure of the injected signal, for example, and in particular, sensitive to local correlations in time and space. Thus, in some cases a core represents a dynamic system, such as in state space, phase space, edge of chaos, etc., which is uniquely used herein to exploit their maximal computational power.

(c) The Cores should be optimally designed with regard to invariance to a set of signal distortions, of interest in relevant applications.

A detailed description of the Computational Core generation and the process for configuring such cores is discussed in more detail in U.S. Pat. No. 8,655,801 referenced above.

Figure 5:
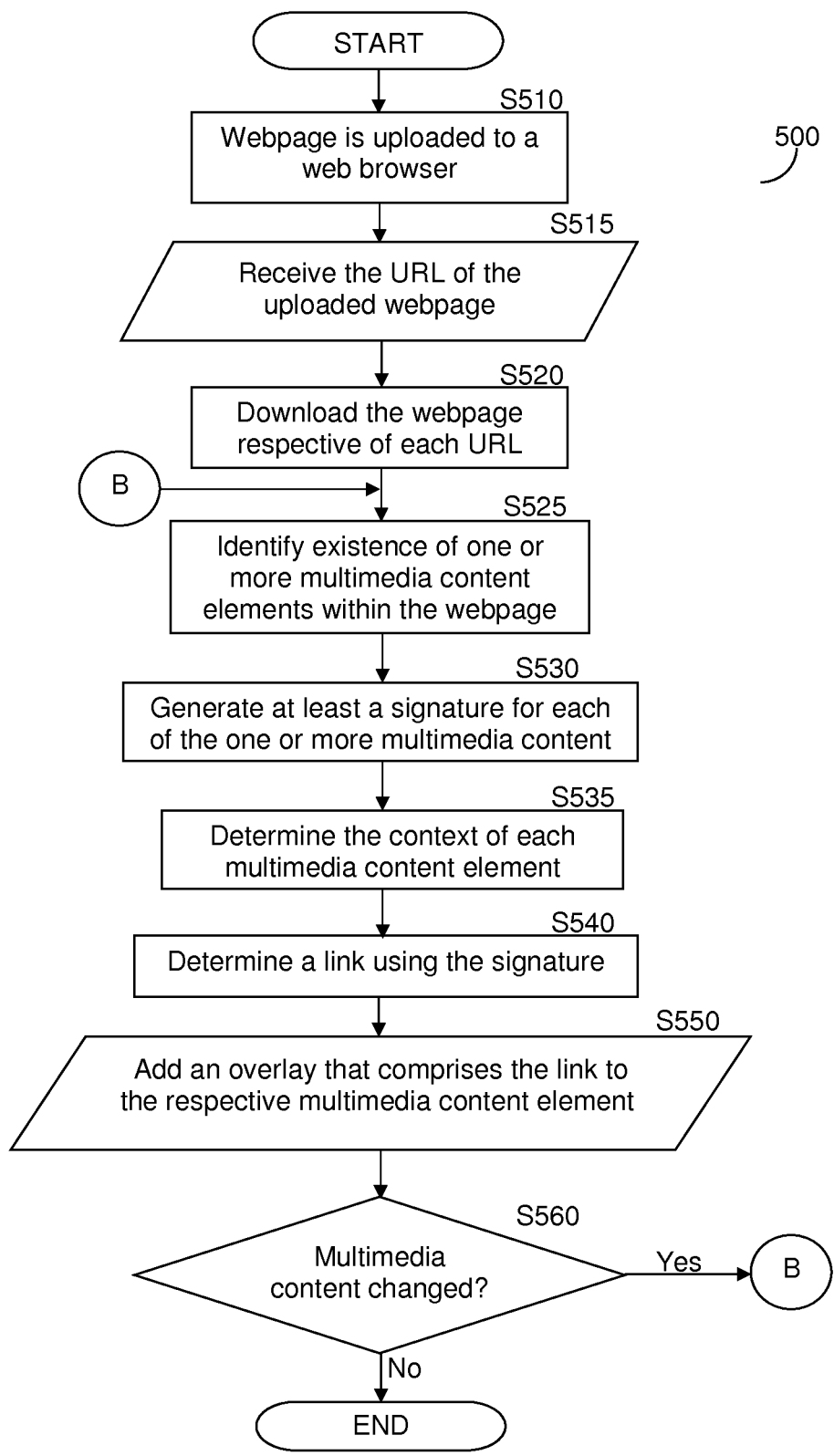
FIG. 5 is a flowchart describing the process of adding an overlay to multimedia content displayed on a webpage.

FIG. 5 depicts an exemplary and non-limiting flowchart 500 describing the process of adding an overlay to a multimedia content element displayed on a webpage. In S510, a webpage is uploaded to a web browser (e.g., the web browser 120-1). In another embodiment, the method starts when a web server (e.g., the web server 150-1) receives a request to host the requested webpage.

In S515, a uniform resource locator (URL) of the uploaded webpage is received. In an embodiment, the URL is received by a context server (e.g., the context server 130). In a further embodiment, the uploaded webpage includes an embedded script. In that embodiment, the embedded script extracts the URL of the webpage and sends the URL to the context server. In another embodiment, an add-on installed in the web browser extracts the URL of the uploaded webpage and sends the URL to the context server.

In yet another embodiment, an agent is installed on a user device executing the web browser. The agent is configured to monitor webpages uploaded to the website, extract the URLs, and send the extracted URLs to the context server. In another embodiment, a web server (e.g., the web server 150) hosting the requested webpage provides the context server with the URL of the requested webpage. It should be noted that only URLs of selected websites can be sent to the context server, for example, URLs related to websites that paid for the additional information.

In S520, the webpage is downloaded respective of each received URL. In an embodiment, the webpage is downloaded by the context server. In S525, the webpage is analyzed in order to identify the existence of one or more multimedia content elements in the webpage. It should be understood that a multimedia content element, such as an image or a video, may include a plurality of multimedia content elements. In S530, at least one signature is generated for each identified multimedia content element. In an embodiment, the signatures are generated by an SGS (e.g., the SGS 140). The signatures for the multimedia content elements are generated as described in greater detail above with respect to FIGS. 3 and 4.

In S535, respective of the generated signatures, the context of each multimedia content element is determined. In an embodiment, the context is determined by the context server. The determination of the context based on the signatures is discussed in more detail herein below with respect to FIG. 6. In S540, respective of the context of each multimedia content element, at least one link to content that exists on a web server is determined. A link may be, but is not limited to, a hyperlink, a URL, and so on.

The content accessed through the link may be, for example, informative webpages such as the Wikipedia® website. The determination of the link may be made by identification of the context of the generated signatures. As an example, if the context of the multimedia content elements was identified as a particular football player, then a link to a sports website that contains information about the football player is determined.

In S550, the determined link is added as an overlay to the webpage respective of the corresponding multimedia content element. According to one embodiment, a link that contains the overlay may be provided to a web browser (e.g., browser 120-1) respective of a user's gesture. A user's gesture may be, but is not limited to, a scroll on the multimedia content element, a click on the multimedia content element, and/or a response to the multimedia content or a portion thereof.

The modified webpage that includes the multimedia content element with the added link can be sent directly to a web browser that is requesting the webpage. This direct sending requires establishing a data session between the context server and the web browser. In another embodiment, the multimedia content element including the added link is returned to a web server (e.g., e.g., the information source 150) hosting the requested webpage. The web server returns the requested webpage with the multimedia element containing the added link to the web browser requesting the webpage. Once the "modified" webpage is displayed over the web browser, a detection of a user gesture over the multimedia element would prompt the web browser to upload the content accessed by the link added to the multimedia element.

In S560, it is checked whether the one or more multimedia content elements contained in the webpage has changed and, if so, execution continues with S525; otherwise, execution terminates.

As a non-limiting example, a webpage containing an image of the movie "Pretty Woman" is uploaded to a context server. A signature is generated by a SGS respective of the actor Richard Gere and the actress Julia Roberts, both shown in the image. The context of the signatures according to this example may be "American Movie Actors". An overlay containing links to Richard Gere's biography and Julia Roberts' biography on the Wikipedia® website is added over the image such that upon detection of a user's gesture, for example, a mouse clicking over the part of the image where Richard Gere is shown, the link to Richard Gere's biography on Wikipedia® is provided to the user of the mouse.

According to another embodiment, a webpage that contains an embedded video clip and a banner advertising New York City is requested by a web browser from an information source. A context server receives the requested URL. The context server analyzes the video content and the banner within the requested webpage, and a signature is generated by a SGS respective of the entertainer Madonna that is shown in the video content and the banner. The context of multimedia content embedded in the webpage is determined to be "live pop shows in NYC." In response to the determined context, a link to a hosted website for purchasing show tickets is added as an overlay to the video clip. The webpage together with the added link is sent to a web server (e.g., the information source 150-1), which then uploads the requested webpage with the modified video element to the web browser.

The webpage may contain a number of multimedia content elements; however, in some instances only a few links may be displayed in the webpage. Accordingly, in one embodiment, the signatures generated for the multimedia content elements are clustered and the cluster of signatures is matched to one or more advertisement items.

Figure 6:
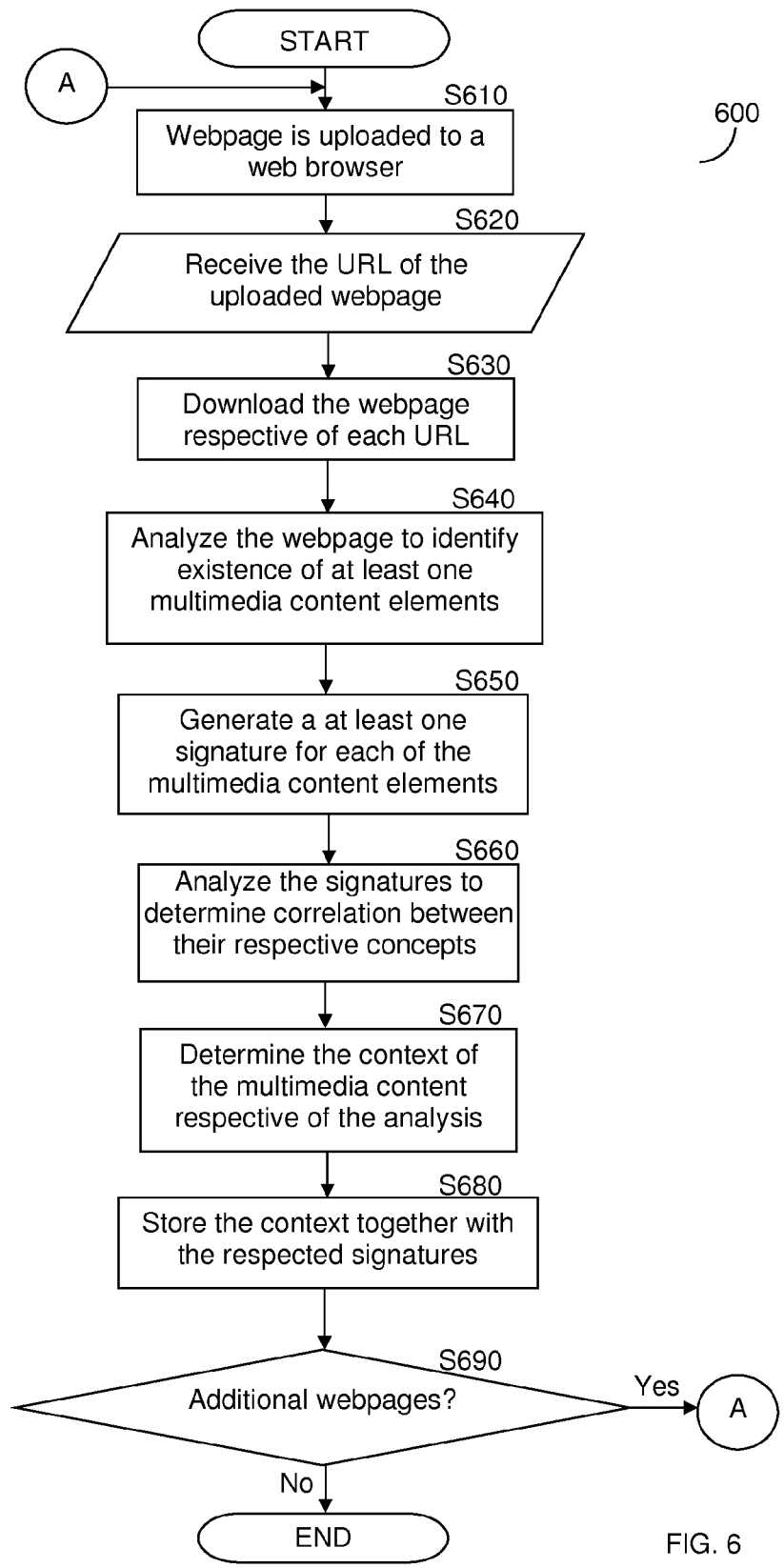
FIG. 6 is a flowchart describing a method for determining the context indicated by the relation between multimedia content elements displayed in a web page.

FIG. 6 illustrates a method for determining a context of a multimedia content element. In S610, a webpage is uploaded to a web browser (e.g., the web browser). In another embodiment, the method starts when a request to host the requested webpage is received by a web server (e.g., web browser 150-1).

In S620, the uniform resource locator (URL) of the webpage to be processed is received. In an embodiment, the URL is received by a context server (e.g., the context server 130). In another embodiment, the uploaded webpage includes an embedded script. The embedded script extracts the URL of the webpage and sends the URL to the context server 130. In another embodiment, an add-on installed in the web browser extracts the URL of the uploaded webpage and sends the URL to the context server.

In yet another embodiment, an agent is installed on a user device executing the web browser. The agent is configured to monitor webpages uploaded to the website, extract the URLs, and send the URLs to the context server. In another embodiment, a web server (e.g., the information source 150-1) hosting the requested webpage provides the context server with the URL of the requested webpage. It should be noted that only URLs of selected websites can be sent to the context server, for example, URLs related to websites that paid for the additional information.

In S630, the webpage respective of each received URL is downloaded. In an embodiment, the webpage is downloaded by a context server (e.g., the context server 130). In S640, the webpage is analyzed in order to identify the existence of one or more multimedia content elements in the uploaded webpage. In an embodiment, the analysis is performed by the context server 130. Each identified multimedia content element is extracted from the webpage and sent to the SGS 140. In S650, for each multimedia content element identified by the context server, at least one signature is generated. In an embodiment, the signatures are generated by an SGS (e.g., the SGS 140). The at least one signature is robust for noise and distortion. The signatures for the multimedia content elements are generated as described in greater detail above in FIGS. 3 and 4. It should also be noted that signatures can be generated for portions of a multimedia content element.

In S660, the signatures are analyzed to determine the correlation among the signatures of all extracted multimedia content elements, or portions thereof. In an embodiment, the signatures are analyzed by the context server. Specifically, each signature may be associated with a different concept. The signatures are analyzed to determine the correlation between concepts. A concept is an abstract description of the content to which the signature was generated. For example, a concept of the signature generated for a picture showing a bouquet of red roses may be "flowers." The correlation between concepts can be achieved by identifying a ratio between signatures' sizes, a spatial location of each signature, and so on using probabilistic models. As noted above, a signature represents a concept and is generated for a multimedia content element. Thus, identifying, for example, the ratio of signatures' sizes may also indicate the ratio between the size of their respective multimedia elements.

A context is determined as the correlation among a plurality of concepts. A strong context is determined when an amount of concepts above a threshold satisfy the same predefined condition. The threshold may be predetermined. As an example, signatures generated for multimedia content elements of a smiling child with a Ferris wheel in the background are analyzed. The concept of the signature associated with the image of the smiling child is "amusement" and the concept of a signature associated with the image of the Ferris wheel is "amusement park." The relation between the signatures of the child and recognized wheel is further analyzed to determine that the Ferris wheel is bigger than the child. The relation analysis determines that the Ferris wheel is used to entertain the child. Therefore, the determined context may be "amusement."

According to one embodiment, one or more typically probabilistic models may be used to determine the correlation between signatures representing concepts. The probabilistic models determine, for example, the probability that a signature may appear in the same orientation and in the same ratio as another signature. When performing the analysis, information maintained in a database (e.g., the data warehouse 160) may be used including, for example, previously analyzed signatures. In S670, based on the analysis performed in S660, the context of a plurality of multimedia content elements existing in the webpage and in the context of the webpage are determined. In an embodiment, the context is determined by the context server.

As an example, an image that contains a plurality of multimedia content elements is identified in an uploaded webpage. At least one signature is generated for each multimedia content element of the plurality of multimedia content elements that exist in the image. According to this example, multimedia content elements of the singer "Adele", the "red carpet," and a "Grammy" award are shown in the image. Signatures are generated respective thereto. The context server 130 analyzes the correlation between "Adele," the "red carpet," and a "Grammy" award, and determines the context of the image based on the correlation. According to this example, such a context may be "Adele Winning a Grammy Award".

As another example, a webpage containing a plurality of multimedia content elements is identified in an uploaded webpage. According to this example, signatures are generated for the objects "glass," "cutlery," and "plate," which appear in the multimedia elements. The correlation between the concepts generated by signatures is analyzed respective of the data maintained in a database such as, for example, analysis of previously generated signatures. According to this example, because all of the concepts of the "glass", the "cutlery", and the "plate" satisfy the same predefined condition, a strong context is determined. The context of such concepts may be a "table set". The context can be also determined respective of a ratio of the sizes of the objects (glass, cutlery, and plate) in the image and the distinction of their spatial orientation.

In S680, the context of the multimedia content together with the respective signatures is stored in a database (e.g., the data warehouse 160) for future use. In S690, it is checked whether there are additional webpages and, if so, execution continues with S610; otherwise, execution terminates.

Figure 7:
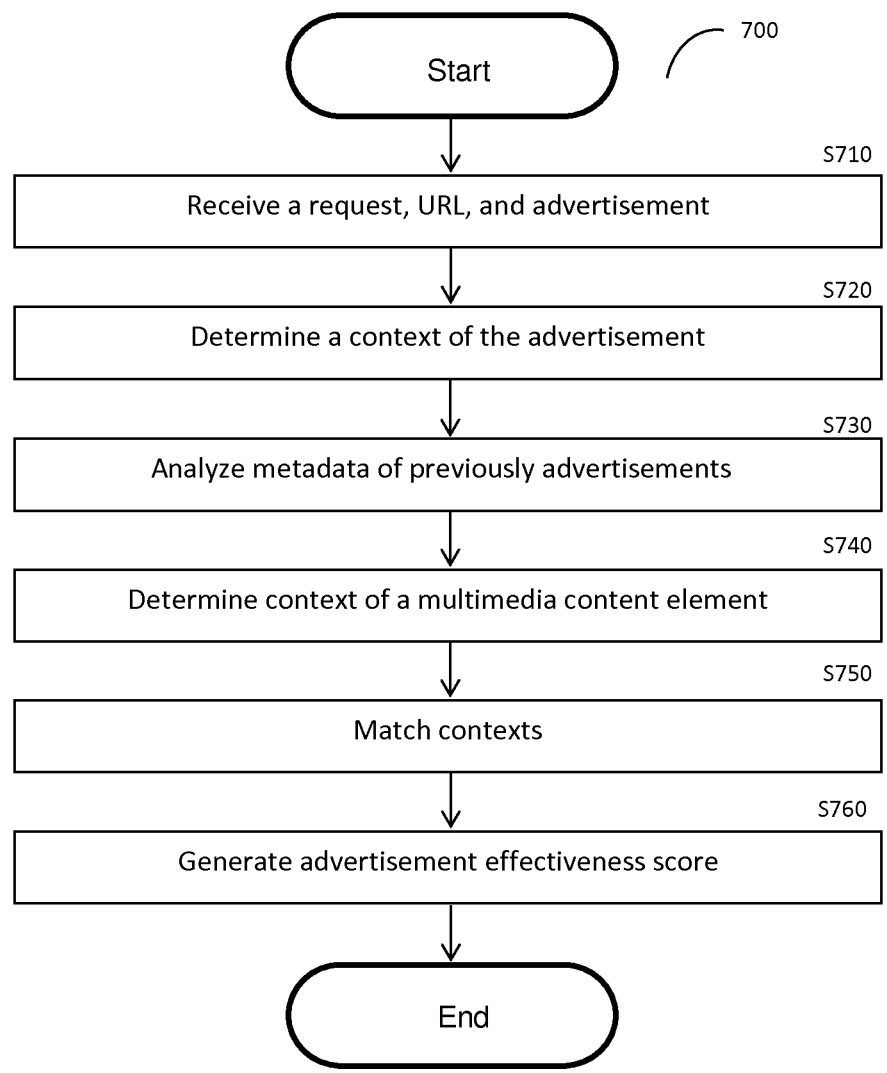
FIG. 7 is a flowchart describing a method for generating an advertisement effectiveness performance score for multimedia content elements existing in a webpage according to an embodiment.

FIG. 7 is an exemplary and non-limiting flowchart 700 illustrating a method for generating an advertisement effectiveness score according to an embodiment. In S710, a request to generate an advertisement effectiveness score for at least one multimedia content element is received. The request may include, for example, a URL of a webpage containing the multimedia content element and an advertisement. The advertisement is likely to be displayed with respect to a multimedia content element and/or in the webpage. For example, the advertisement can be displayed over the multimedia content element. It should be noted that the advertisement is an online advertisement which may be in a form of multimedia content.

In an embodiment, the URL is received by a context server (e.g., the context server 130). In another embodiment, the webpage includes an embedded script (e.g., a JavaScript). The script may be programmed to extract the URL of the webpage and/or the multimedia content element, and send the URL and/or the multimedia content element to the context server. In another embodiment, an add-on installed in a web browser (e.g., the web browser 120) extracts the URL of the uploaded webpage and sends the URL to the context server.

In S720, a context of the advertisement is determined. In an embodiment, S720 includes generating at least one signature for the advertisement and determining matching context(s) based on the at least one generated signature(s) as described further herein above with respect to FIG. 6.

In S730, metadata associated with advertisements that were previously displayed with respect to (e.g., as an overlaid on) the multimedia content element contained in the webpage is analyzed. The received metadata may be, but is not limited to, a number of interactions of users with an advertisement, a duration of advertisement overlay, a type of interaction of users with an advertisement, and so on. The received metadata is related to information that is useful in determining an effectiveness of the previous advertisements with respect to the multimedia content element contained in the webpage.

In a further embodiment, the only metadata associated with prior advertisements that have the same or a similar context with the advertisement are analyzed. Two contexts may be similar or the same if, for example, signatures representing the contexts demonstrate matching above a predefined threshold. Signature matching is described further herein above with respect to FIGS. 3 and 4. As an example, if the advertisement to be overlaid has a context of "vacuum cleaners," then only metadata demonstrating the effectiveness of other advertisements related to vacuum cleaners or other cleaning products may be received.

In an embodiment, the analysis yields a prior advertisement success score. The prior advertisement success score may be, but is not limited to, a numerical value, e.g., a value between 1 and 10, where a value of 1 represents low success and a value of 10 represents high success. In a further embodiment, the prior advertisement success score may be decreased if the contexts of the prior advertisements do not match the context of the advertisement to be overlaid above a predefined threshold.

As a non-limiting example of determining prior advertisement success scores, if previous advertisements that have the same or similar context as the advertisement to be overlaid were only displayed for 5 seconds but yielded 7,000 clicks in 10,000 views, the prior advertisement success score may be determined to be 9 on a scale from 1 to 10. As another non-limiting example, if previous advertisements that have the same or similar context as the advertisement to be overlaid were only displayed for the entire 2 minute video and yielded 7,000 clicks in 10,000 views, the prior advertisement success score may be determined to be 7 on a scale from 1 to 10.

In S740, a context of the multimedia content element contained in the webpage is determined. Determining contexts of multimedia content elements contained in webpages is described further herein above with respect to FIG. 6.

In S750, the context of the multimedia content element contained in the webpage and the context of the advertisement are matched. In an embodiment, this matching may involve conducting signature matching between signatures that represent the context of the multimedia content element and signatures that represent the context of the advertisement. Signature matching is described further herein above with respect to FIGS. 3 and 4. This context matching yields a context matching score. The context matching score is typically a numerical value such as, but not limited to, a value between 1 and 10, where a value of 1 represents low matching and a value of 10 represents high matching.

In S760, an advertisement effectiveness score is generated based on the prior advertisement success score and the context matching score. The advertisement effectiveness score is a value representing the likelihood that the advertisement will capture a particular user's attention. The advertisement effectiveness score may be, but is not limited to, a numerical value (e.g., 1 through 10), a grade value (e.g., F through A, with F being the lowest grade and A being the highest grade), a categorical value (e.g., one of poor, moderate, and good), and so on.

The advertisement effectiveness score may be generated by, but is not limited to, adding the prior advertisement success score and the context matching score, multiplying the prior advertisement success score by the context matching score, and performing other operations on the prior advertisement success score and the context matching score.

In various embodiments, the prior advertisement success score and the context matching score may be assigned weighted values that affect the influence of each score in determining the advertisement effectiveness score. In an embodiment, if no prior advertisements have been overlaid on the multimedia content element contained in the webpage, the prior advertisement success score may be assigned a weight of 0. In an embodiment, once a numerical value for the advertisement effectiveness score is determined, the numerical value may then be converted to, e.g., a grade value or a categorical value. As an example, a numerical advertisement effectiveness score of 9 may be converted into a grade value of "A" or a categorical value of "good."

In another embodiment, if the advertisement effectiveness score is determined to be above a predefined threshold, the advertisement may be provided to a user device be overlaid on the multimedia content element displayed on the webpage. This embodiment allows advertisers to choose to have appropriate advertisements automatically sent to users while ensuring that the sent advertisements are more likely to garner significant user attention.

As a non-limiting example of determining an advertisement effectiveness score based on the analysis of the metadata, two images of the same refrigerator are shown in an electronic-commerce webpage. Metadata received respective of both of the images indicates that more users interact with one image of the refrigerator than the other. Therefore, the advertisement effectiveness of the first image is determined as higher than the advertisement effectiveness of the second image.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiments and the concepts contributed by the inventor to furthering the art, and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for generating an advertisement effectiveness score of a multimedia content element displayed in a webpage, comprising:
   determining an advertisement context of an advertisement;
   analyzing metadata associated with at least one prior advertisement to determine a prior advertisement success score;
   determining a multimedia context of the multimedia content element displayed in the webpage, wherein the multimedia context is determined based on at least one signature generated for the multimedia content element displayed in the webpage;
   matching the advertisement context to the multimedia context to determine a context matching score; and
   generating the advertisement effectiveness score at least based on the prior advertisement success score and the context matching score; and
   generating, by a signature generator system, signatures for a plurality of multimedia content elements that are clustered to determine context of the webpage utilized to search for a matching advertisement, wherein upon identification of a user gesture and determining the advertisement effective score is above a predefined threshold, the matching advertisement is generated and overlaid on the multimedia content element displayed in the webpage, wherein the user gesture is any one of: a scroll on the multimedia content element, a press on the multimedia content element, and a response to the multimedia content elements.

2. The method of claim 1, wherein the analyzed metadata is any one of: a number of interactions of users with a prior advertisement, a duration of overlay of a prior advertisement, and a type of interaction of users interacting with a prior advertisement.

3. The method of claim 1, wherein analyzing the metadata associated with the at least one prior advertisement to determine a prior advertisement success score further comprises:
   determining a plurality of prior advertisement contexts of the at least one prior advertisement;
   matching each prior advertisement context of the plurality of prior advertisement contexts to the advertisement context;
   upon determining that at least one prior advertisement matches the advertisement context above a predefined threshold, analyzing metadata associated with the at least one matching prior advertisement.

4. The method of claim 3, further comprising:
   upon determining that at least one prior advertisement does not match the advertisement context above the predefined threshold, reducing the prior advertisement success score.

5. The method of claim 1, wherein the advertisement effectiveness score is a value representing the likelihood that the advertisement will capture a particular user's attention when overlaid on the multimedia content element, wherein the value is any one of: a numerical value, a grade value, and a categorical value.

6. The method of claim 1, wherein the multimedia content element is at least one of: an image, a graphic, a video stream, a video clip, an audio stream, an audio clip, a video frame, a photograph, and an image of signals.

7. A non-transitory computer readable medium having stored thereon instructions for causing one or more processing units to execute the method according to claim 1.

8. A system for generating an advertisement effectiveness score of a multimedia content element displayed in a webpage, comprising:
   a processing unit; and
   a memory, the memory containing instructions that when, executed by the processing unit, configured the system to:
   determine an advertisement context of an advertisement;
   analyze metadata associated with at least one prior advertisement to determine a prior advertisement success score;
   determine a multimedia context of the multimedia content element displayed in the webpage, wherein the multimedia context is determined based on at least one signature generated for the multimedia content element displayed in the webpage;
   match the advertisement context to the multimedia context to determine a context matching score; and
   generate the advertisement effectiveness score at least based on the prior advertisement success score and the context matching score;
   generate, by a signature generator system, signatures for a plurality of multimedia content elements that are clustered to determine context of the webpage utilized to search for a matching advertisement, wherein upon identification of a user gesture and determining the advertisement effective score is above a predefined threshold, the matching advertisement is generated and overlaid on the multimedia content element displayed in the webpage, wherein the user gesture is any one of: a scroll on the multimedia content element, a press on the multimedia content element, and a response to the multimedia content elements.

9. The system of claim 8, wherein the analyzed metadata is any one of: a number of interactions of users with a prior advertisement, a duration of overlay of a prior advertisement, and a type of interaction of users interacting with a prior advertisement.

10. The system of claim 8, wherein the system is further configured to:
   determine a plurality of prior advertisement contexts of the at least one prior advertisement;
   match each prior advertisement context of the plurality of prior advertisement contexts to the advertisement context;
   upon determining that at least one prior advertisement matches the advertisement context above a predefined threshold, analyze metadata associated with the at least one matching prior advertisement.

11. The system of claim 10, wherein the system is further configured to:
   upon determining that at least one prior advertisement does not match the advertisement context above the predefined threshold, reduce the prior advertisement success score.

12. The system of claim 8, wherein the advertisement effectiveness score is a value representing the likelihood that the advertisement will capture a particular user's attention when overlaid on the multimedia content element, wherein the value is any one of: a numerical value, a grade value, and a categorical value.

13. The system of claim 8, wherein the multimedia content element is at least one of: an image, a graphic, a video stream, a video clip, an audio stream, an audio clip, a video frame, a photograph, and an image of signals.

* * * * *